US012615014B2

(12) United States Patent
Li et al.

(10) Patent No.: US 12,615,014 B2
(45) Date of Patent: Apr. 28, 2026

(54) TESTING DEVICE AND METHOD FOR TESTING PHOTOVOLTAIC MODULE

(71) Applicant: JINKO SOLAR (HAINING) CO., LTD., Haining City (CN)

(72) Inventors: Ning Li, Haining City (CN); Sen Yang, Haining City (CN); Pengjun Xiao, Haining City (CN); Bo Li, Haining City (CN); Jiaxiang Yin, Haining City (CN)

(73) Assignee: JINKO SOLAR (HAINING) CO., LTD., Haining City (CN)

( * ) Notice: Subject to any disclaimer, the term of this patent is extended or adjusted under 35 U.S.C. 154(b) by 527 days.

(21) Appl. No.: 18/090,690

(22) Filed: Dec. 29, 2022

(65) Prior Publication Data

US 2024/0192103 A1     Jun. 13, 2024

(30) Foreign Application Priority Data

Dec. 12, 2022   (CN) .......................... 202211600289.1
Dec. 12, 2022   (CN) .......................... 202211610645.8
(Continued)

(51) Int. Cl.
*H02S 50/10*           (2014.01)

(52) U.S. Cl.
CPC ................................... *H02S 50/10* (2014.12)

(58) Field of Classification Search
CPC ................................................ H02S 50/00–10
See application file for complete search history.

(56) References Cited

U.S. PATENT DOCUMENTS 6,271,462 B1 *   8/2001   Tsuzuki .................. H10F 71/00
                                                                438/57
8,534,134 B2 *   9/2013   Buehler .................... G01N 3/12
                                                                73/798
(Continued)

FOREIGN PATENT DOCUMENTS

CN          104330309 A      2/2015
CN          106198261       12/2016
(Continued)

OTHER PUBLICATIONS

IEC 61215-2, International Electrotechnical Commission (IEC), Feb. 2021 (Year: 2021).*

(Continued)

*Primary Examiner* — Judy Nguyen
*Assistant Examiner* — James Split
(74) *Attorney, Agent, or Firm* — Burris Law, PLLC

(57) ABSTRACT

A test device and a method for testing a photovoltaic module, for testing anti-stepping performance of the photovoltaic module. The test device includes first and second test members spaced apart along a first direction. The first and second test members are configured to abut against the photovoltaic module and apply a preset load to the photovoltaic module. The first test member is at a first position when the first test member abuts against the photovoltaic module, the second test member is at a second position when the second test member abuts against the photovoltaic module, and along a movement direction of the first and second test members in a horizontal plane, the first and second positions are alternately spaced apart, to simulate force on the photovoltaic module when an operator walks on the photovoltaic module.

7 Claims, 13 Drawing Sheets

(30) Foreign Application Priority Data

| Dec. 12, 2022 | (CN) | .......................... | 202223341463.3 |
|---|---|---|---|
| Dec. 12, 2022 | (CN) | .......................... | 202223344505.9 |

(56) References Cited

U.S. PATENT DOCUMENTS

| | | | |
|---|---|---|---|
| 10,197,482 B2 * | 2/2019 | Gao | ........................ G01N 3/20 |
| 11,349,433 B2 * | 5/2022 | Han | ........................ H02S 50/15 |
| 2011/0283806 A1 | 11/2011 | Buehler et al. | |
| 2013/0167907 A1 | 7/2013 | Bitarchas et al. | |
| 2019/0199284 A1 * | 6/2019 | Sun | ........................ H02S 50/15 |
| 2019/0199285 A1 * | 6/2019 | Sun | ........................ H02S 50/15 |
| 2021/0028746 A1 | 1/2021 | Hacke | |
| 2021/0211095 A1 | 7/2021 | Xu et al. | |

FOREIGN PATENT DOCUMENTS

| | | | | | |
|---|---|---|---|---|---|
| CN | 106989883 A | 7/2017 | | | |
| CN | 206960267 | 2/2018 | | | |
| CN | 207135068 | 3/2018 | | | |
| CN | 107968620 | 4/2018 | | | |
| CN | 107968620 A | * | 4/2018 | ............ | E04D 13/00 |
| CN | 108444824 | 8/2018 | | | |
| CN | 108548657 | 9/2018 | | | |
| CN | 110414026 | 11/2019 | | | |
| CN | 110595742 | 12/2019 | | | |
| CN | 111313832 | 6/2020 | | | |
| CN | 211042675 | 7/2020 | | | |
| CN | 111521311 | 8/2020 | | | |
| CN | 212534829 | 2/2021 | | | |
| CN | 213121052 | 5/2021 | | | |
| CN | 112903486 | 6/2021 | | | |
| CN | 112903486 A | * | 6/2021 | .............. | G01N 3/32 |
| CN | 213626319 | 7/2021 | | | |
| CN | 113612443 | 11/2021 | | | |
| CN | 113984541 A | 1/2022 | | | |
| CN | 114070197 | 2/2022 | | | |
| CN | 114892902 A | 8/2022 | | | |
| CN | 115065308 | 9/2022 | | | |
| CN | 217461231 | 9/2022 | | | |
| CN | 217537576 | 10/2022 | | | |
| CN | 217878688 | 11/2022 | | | |
| CN | 217975106 | 12/2022 | | | |
| CN | 115800913 | 3/2023 | | | |
| CN | 115811277 | 3/2023 | | | |
| CN | 115987215 | 4/2023 | | | |
| CN | 219181462 | 6/2023 | | | |
| CN | 219532738 | 8/2023 | | | |
| KR | 20110137847 | 12/2011 | | | |
| KR | 20160087582 | 7/2016 | | | |
| KR | 20170132041 | 12/2017 | | | |
| KR | 20190026177 | 3/2019 | | | |
| WO | WO-2010092665 A1 * | 8/2010 | ............ | H10F 71/00 | |
| WO | 2011045434 | 4/2011 | | | |
| WO | 2020231683 | 11/2020 | | | |

OTHER PUBLICATIONS

Extended European Search Report issued in corresponding EP Application 23153029.6, issued Sep. 13, 2023, 6 pages.

Patent search report; Date of Mailing: Oct. 28, 2022(12 pages).

International Search Report (PCT/CN2023/105126); Date of Mailing: Oct. 7, 2023(7 pages).

International Search Report (PCT/CN2023/105113); Date of Mailing: Sep. 22, 2023(8 pages).

International Search Report (PCT/CN2023/105098); Date of Mailing: Aug. 18, 2023(7 pages).

International Search Report (PCT/CN2023/105145); Date of Mailing: Oct. 11, 2023(8 pages).

International Search Report (PCT/CN2023/105134); Date of Mailing: Sep. 27, 2023(7 pages).

International Search Report (PCT/CN2023/105065); Date of Mailing: Aug. 17, 2023(8 pages).

European Office Action for Application No. 23156254.7, mailed Oct. 11, 2025 (4 pages).

US Office Action for U.S. Appl. No. 18/090,715, mailed Aug. 29, 2025 (23 pages).

International Search Report (PCT/CN2023/105160); Date of Mailing: Oct. 13, 2023(8 pages).

Patent search report 2; Date of Mailing: Oct. 27, 2022(10 pages).

Patent search report 1; Date of Mailing: Oct. 28, 2022(18 pages).

Proceedings / EU PVSEC 2013, 28th European Photovoltaic Solar Energy Conference and Exhibition, Parc Des Expositions Paris Nord Villepinte, Paris, France, Conference Sep. 30-Oct. 4, 2013, Exhibition Oct. 1-3, 2013 : The Most Inspiring PL, Dec. 16, 2013 (Dec. 16, 2013), XP040635916, ISBN: 978-3-936338-33-1.

Patent search report 3; Date of Mailing: Oct. 28, 2022(16 pages).

Yang, Xiaojun et al."Research on the Pressure Resistance of Photovoltaic Modules Under Different Aluminum Frame Structures", Popular Standardization, Sep. 23, 2020 (Sep. 23, 2020) pp. 153-154.

IEC 61215-2, Terrestrial photovoltaic (PV) modules—Design qualification and type approval—Part 2: Test procedures, Feb. 24, 2021(57 pages).

The US Office Action for U.S. Appl. No. 18/090,715, mailed Jan. 7, 2026 (22 pages).

* cited by examiner

TESTING DEVICE AND METHOD FOR TESTING PHOTOVOLTAIC MODULE

CROSS-REFERENCE TO RELATED APPLICATIONS

This application claims priority to Chinese Patent Application No. 202211600289.1, filed on Dec. 12, 2022, to Chinese Patent Application No. 202223341463.3, filed Dec. 12, 2022, to Chinese Patent Application No. 202223344505.9, filed Dec. 12, 2022, and to Chinese Patent Application No. 202211610645.8, filed Dec. 12, 2022, the contents of which are incorporated herein by reference in their entireties.

FIELD

The present disclosure relates to the technical field of photovoltaic modules, and in particular, to a test device and a method for testing a photovoltaic module.

BACKGROUND

The statements in this section merely provide background information related to the present disclosure and may not constitute prior art.

A photovoltaic assembly includes a color steel tile assembly and a photovoltaic module mounted on the color steel tile assembly. During the mounting of the photovoltaic module, an operator needs to step on the photovoltaic module for easy operation. However, during the stepping process, corners of the photovoltaic module and unsupported portions after the photovoltaic module is connected to color steel tiles are prone to risks of hidden cracks and fractures.

Therefore, after machining and manufacturing of the photovoltaic module, there is a need to determine whether anti-stepping performance of the photovoltaic module is as required, so as to adjust parameters such as material, structure, and manufacturing process of the photovoltaic module.

SUMMARY

This section provides a general summary of the disclosure and is not a comprehensive disclosure of its full scope or all of its features.

The present disclosure provides a test device and a method for testing a photovoltaic module, which can test anti-stepping performance of the photovoltaic module.

In a first aspect of the present disclosure, a test device is provided, for testing anti-stepping performance of a photovoltaic module, the test device includes a first test member and a second test member spaced apart from one another along a first direction, the first test member and the second test member are configured to abut against the photovoltaic module and apply a preset load to the photovoltaic module. The first test member is at a first position when the first test member abuts against the photovoltaic module, the second test member is at a second position when the second test member abuts against the photovoltaic module. Along a movement direction of the first test member and the second test member in a horizontal plane, the first position and the second position are alternately spaced apart, and a distance L1 between the first position and the adjacent second position satisfies: 400 mm≤L1≤800 mm. The first direction is a length direction or a width direction of the photovoltaic module.

In the present disclosure, the first test member and the second test member apply the preset load to the photovoltaic module, and the first position and the second position are alternately spaced apart from one another along the movement direction of the first test member and the second test member in the horizontal plane. That is, the first test member and the second test member respectively simulate left and right feet of an operator to simulate force on the photovoltaic module when the operator walks on a surface of the photovoltaic module, so as to easily adjust and replace a material and a manufacturing process of the photovoltaic module according to test results, so that the photovoltaic module has stronger anti-stepping performance, prolonging the service life of the photovoltaic module. 400 mm≤L1≤800 mm enables the distance between the first position and the adjacent second position to match a step distance of the operator, which increases accuracy and reliability of the test results of the test device, thereby improving operation performance of the test device.

In some embodiments, the first test member is provided with a first abutment surface for abutting against the photovoltaic module, and the second test member is provided with a second abutment surface for abutting against the photovoltaic module. Along the first direction, a distance L2 between a geometric center of the first abutment surface and a geometric center of the second abutment surface satisfies: 100 mm≤L2≤500 mm.

In some embodiments, the first test member and the second test member are alternately movable along a thickness direction of the photovoltaic module. A time t from contact of the first test member with the photovoltaic module to contact of the second test member with the photovoltaic module satisfies: 0 s<t≤5 s.

In some embodiments, the first test member and the second test member are both movable along a thickness direction of the photovoltaic module. Along the thickness direction of the photovoltaic module, a moving distance S1 of the first test member satisfies: 0 mm<S1≤60 mm; and along the thickness direction of the photovoltaic module, a moving distance S2 of the second test member satisfies: 0 mm<S2≤60 mm.

In some embodiments, a weight W1 of the first test member satisfies: 50 KG≤W1≤160 KG; and a weight W2 of the second test member satisfies: 50 KG≤W2≤160 KG.

In some embodiments, an area of the first abutment surface ranges from 50 cm² to 200 cm²; and an area of the second abutment surface ranges from 50 cm² to 200 cm².

In some embodiments, a contour of the first abutment surface and a contour of the second abutment surface are similar to a contour of a shoe sole; or the contour of the first abutment surface is one or more of a circle, a rectangle, and an oval, and the contour of the second abutment surface is one or more of a circle, a rectangle, and an oval.

In a second aspect of the present disclosure, a method for testing a photovoltaic module is provided, applied for testing anti-stepping performance of the photovoltaic module. The method includes: performing a defect inspection test on the photovoltaic module, and recording a test result as an initial result; mounting the photovoltaic module on a color steel tile assembly; applying a preset load to the photovoltaic module at a preset frequency by using a test device; performing the defect inspection test on the loaded photovoltaic module, and recording a test result as a loading result; and comparatively analyzing the initial result and the loading result.

In the present disclosure, the test device applies the preset load to the photovoltaic module at the preset frequency, to be capable of simulating the process of the operator stepping on the surface of the photovoltaic module, and comparatively analyzes the initial result and the loading result, to be capable of determining whether a structure of the loaded photovoltaic module meets a normal operation requirement of the photovoltaic module, thereby realizing judgment of the anti-stepping performance of the photovoltaic module, so as to facilitate subsequent adjustment of parameters such as the structure, the material, and the manufacturing process of the photovoltaic module.

In some embodiments, the photovoltaic module includes a connecting portion and an unsupported portion, the connecting portion is configured to contact the color steel tile assembly, the unsupported portion is configured to define a cavity with a color steel tile. The photovoltaic module is provided with a first test surface, a second test surface, and a third test surface, the first test surface is located at an edge of the connecting portion, the second test surface is located at the unsupported portion, and the third test surface is located at a corner of the photovoltaic module. The test device includes a drive assembly and a test member, the drive assembly is capable of driving the test member to move along a length direction, a width direction, and a thickness direction of the photovoltaic module. The applying a preset load to the photovoltaic module at a preset frequency by using a test device includes: driving, by the drive assembly, the test member to move along the length direction and/or the width direction of the photovoltaic module and, at the same time, driving, by the drive assembly, the test member to move along the thickness direction of the photovoltaic module at the preset frequency; and applying, by the test member, the preset load to at least one of the first test surface, the second test surface, and the third test surface.

In some embodiments, the applying a preset load to the photovoltaic module at a preset frequency by using a test device includes: applying, by the test member, the preset load to the first test surface, the second test surface, and the third test surface during movement of the test member.

In some embodiments, the photovoltaic module is further provided with a fourth test surface, the fourth surface is a surface other than the first test surface, the second test surface, and the third test surface. The applying a preset load to the photovoltaic module at a preset frequency by using a test device includes: applying, by the test member, the preset load to the fourth test surface during movement of the test member.

In some embodiments, the defect inspection test includes appearance inspection. The performing a defect inspection test on the photovoltaic module, and recording a test result as an initial result includes: inspecting an appearance of the photovoltaic module, and recording a number and a size of appearance defects of the photovoltaic module as an appearance initial result. The performing the defect inspection test on the loaded photovoltaic module, and recording a test result as a loading result includes: inspecting an appearance of the loaded photovoltaic module, and recording a number and a size of appearance defects of the loaded photovoltaic module as an appearance loading result. The comparatively analyzing the initial result and the loading result includes: comparatively analyzing the appearance initial result and the appearance loading result, and determining a degree of change in the appearance of the loaded photovoltaic module. The appearance inspection includes external defect inspection and/or an internal defect test.

In some embodiments, the defect inspection test includes a performance test. The performing a defect inspection test on the photovoltaic module, and recording a test result as an initial result includes: testing performance of the photovoltaic module, and recording a test result as an initial performance test result. The performing the defect inspection test on the loaded photovoltaic module, and recording a test result as a loading result includes: testing operation performance of the loaded photovoltaic module, and recording a test result as a loading performance test result; and comparatively analyzing the initial performance test result and the loading performance test result, and determining a degree of change in the operation performance of the loaded photovoltaic module.

In some embodiments, the defect inspection test includes an environmental aging test. The performing a defect inspection test on the photovoltaic module, and recording a test result as an initial result includes: performing the environmental aging test on the photovoltaic module, and recording a test result as a pre-aging result. The performing the defect inspection test on the loaded photovoltaic module, and recording a test result as a loading result includes: performing the environmental aging test on the loaded photovoltaic module, and recording a test result as a post-aging result. The comparatively analyzing the initial result and the loading result includes: comparatively analyzing the pre-aging result and the post-aging result, and determining a degree of environmental aging of the loaded photovoltaic module.

In some embodiments, subsequent to the applying a preset load to the photovoltaic module at a preset frequency by using a test device, the method includes: performing an IEC 61215-2 MQT 20 test on the photovoltaic module.

In some embodiments, the color steel tile assembly includes color steel tiles and a clamp, the color steel tiles each includes a male rib and a female rib arranged opposite to each other along a width direction of the color steel tile, the male rib is fixedly connected to the female rib of the adjacent color steel tile, the male rib and the female rib are each provided with a bending portion; the photovoltaic module is mounted on the color steel tile through the clamp, and a part of the photovoltaic module connected to the clamp is the connecting portion; and along the thickness direction of the photovoltaic module, a preset distance is defined between the photovoltaic module and the bending portion. The photovoltaic module is capable of abutting against the bending portion when the photovoltaic module is under pressure along the thickness direction, and a part of the photovoltaic module abutting against the bending portion is the connecting portion.

In some embodiments, the bending portion includes a first bending portion extending along a width direction of the color steel tile, along the thickness direction of the photovoltaic module, a preset distance is defined between the photovoltaic module and the first bending portion, and when the photovoltaic module is under pressure, the photovoltaic component is capable of abutting against the first bending portion.

In some embodiments, along the thickness direction of the photovoltaic module, a distance $L1$ between the photovoltaic module and the first bending portion satisfies: 5 mm$\leq$L1$\leq$20 mm.

In some embodiments, along the width direction of the color steel tile, a length of the male rib and a length of the female rib are both $L2$, a length $L3$ of the first bending portion is $L3$, and $L2$ and $L3$ satisfy: 1:5$\leq$L3:L2$\leq$4:5.

In some embodiments, the color steel tile further includes a bottom plate, and the male rib and the female rib are arranged on two sides of the bottom plate; the bottom plate is provided with a crimping portion, along the width direction of the color steel tile, the crimping portion is located between the male rib and the female rib, and along the thickness direction of the photovoltaic module, the crimping portion protrudes toward the photovoltaic module. A height of the first bending portion is H1, a height of the crimping portion is H2, and H1 and H2 satisfy: 0≤H2−H1≤12 mm.

In some embodiments, the male rib is connected to the female rib of an adjacent color steel tile to form an over-locking, one end of the clamp is connected to the overlocking, and the other end of the clamp is connected to the photovoltaic module. The clamp includes a clamping assembly, the clamping assembly includes a first clamping piece and a second clamping piece arranged opposite to each other along the thickness direction of the photovoltaic module, and the clamp clamps and secures the photovoltaic module through the first clamping piece and the second clamping piece.

In some embodiments, along the thickness direction of the photovoltaic module, the second clamping piece is located between the first clamping piece and the bending portion, and a minimum distance L4 between the second clamping piece and the bending portion satisfies: 0≤L4≤6 mm.

It should be understood that the general description above and the detailed description in the following are merely exemplary and illustrative, and cannot limit the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
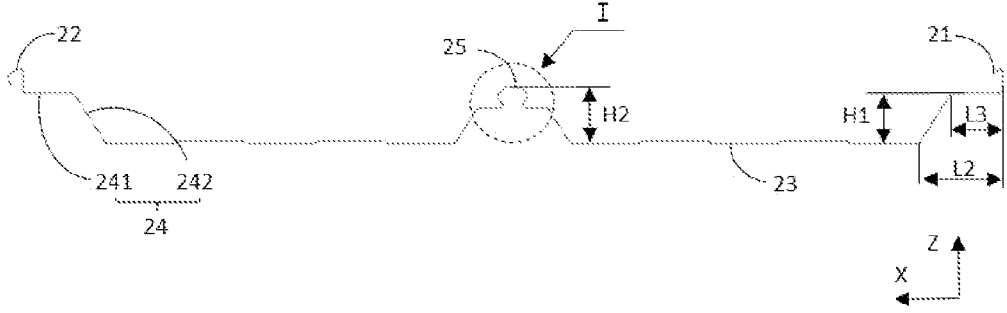
FIG. 1 is a schematic structural diagram showing connection of a color steel tile according to one or more embodiments of the present disclosure.

The drawings described herein are for illustration purposes only and are not intended to limit the scope of the present disclosure in any way.

DETAILED DESCRIPTION OF EMBODIMENTS

The following description is merely exemplary in nature and is not intended to limit the present disclosure, application, or uses. It should be understood that throughout the drawings, corresponding reference numerals indicate like or corresponding parts and features.

It should be made clear that the embodiments described are only some rather than all of the embodiments of the present disclosure. All other embodiments acquired by those of ordinary skill in the art without creative efforts based on the embodiments of the present disclosure fall within the protection scope of the present disclosure.

The terms used in the embodiments of the present disclosure are intended solely to describe particular embodiments and are not intended to limit the present disclosure. As used in the specification of the present disclosure and the appended claims, the singular forms of "a/an", "the", and "said" are intended to include plural forms, unless otherwise clearly specified in the context.

It should be understood that the term "and/or" used herein only describes an association relationship between associated objects and represents that three relationships may exist. For example, A and/or B may represent the following three cases: only A exists, both A and B exist, and only B exists. In addition, the character "/" herein generally means that associated objects before and after it are in an "or" relationship.

It is to be noted that positional terms such as "above", "below", "left", and "right" described in the embodiments of the present disclosure are described from the perspective shown in the drawings and should not be construed as limiting the embodiments of the present disclosure. In addition, in the context, it should be further understood that, when an element is referred to as "above" or "below" another element, it can be directly connected "above" or "below" another element, and can also be indirectly connected "above" or "below" another element through an intermediate element.

Some embodiments of the present disclosure provide a photovoltaic assembly. In one or more embodiments, the photovoltaic assembly includes a photovoltaic module 1 and a mounting bracket (not labelled in the figure). The photovoltaic module 1 is directly mounted on the ground or on a building main body through the mounting bracket, so as to use solar power to meet daily use requirements. The building main body includes, but is not limited to, roofs and walls of buildings such as workshops and warehouses of production enterprises.

In other embodiments, as shown in FIG. 1 to FIG. 4, the photovoltaic assembly includes a plurality of color steel tile 2 assemblies and a photovoltaic module 1 connected to the color steel tile 2 assemblies. The color steel tile 2 assemblies each include color steel tiles 2 and a support 5. The color steel tiles 2 are mounted on the ground or on a building main body through the support 5, so as to use solar power to generate electricity for daily use.

Figure 3:
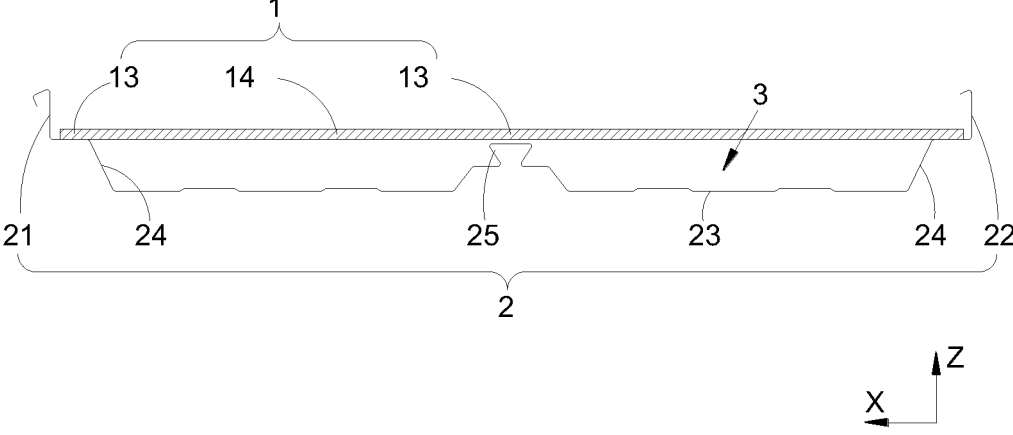
FIG. 3 is a schematic structural diagram of a connection structure of a photovoltaic assembly according to one or more embodiments of the present disclosure.
Figure 4:
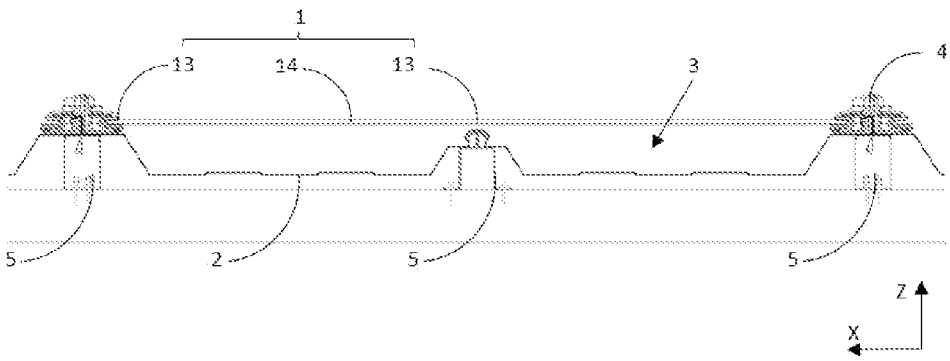
FIG. 4 is a schematic structural diagram showing connection of the photovoltaic assembly according to some other embodiments of the present disclosure.

As shown in FIG. 3 and FIG. 4, the photovoltaic assembly has a first direction X, a second direction Z, and a third direction Y perpendicular to one another. The first direction X is a width direction of the color steel tile 2, the second direction Z is a thickness direction of the color steel tile 2, and the third direction Y is a length direction of the color steel tile 2.

A specific structure of the color steel tile 2 is shown in FIG. 1. The color steel tile 2 includes a bottom plate 23, and a male rib 21 and a female rib 22 arranged opposite to each other on two sides of the bottom plate 23 along the first direction X. The male rib 21 is fixedly connected to the female rib 22 of the adjacent color steel tile 2 to form a lock seam. The male rib 21 and the female rib 22 are each provided with a bending portion 24 for connection with the bottom plate 23. The bottom plate 23 is provided with a crimping portion 25 protruding upwards along the second direction Z. Along the first direction X, the crimping portion 25 is located between the male rib 21 and the female rib 22. The bottom plate 23 is provided with reinforcing ribs protruding upwards along the second direction Z. When a photovoltaic tile is used in a strong wind environment, air flows through an upper surface of the color steel tile 2, which reduces pressure of the upper surface of the color steel tile 2, so that a pressure difference exists between an upper surface and a lower surface of the bottom plate 23. In this case, the crimping portion 25, the reinforcing ribs, and the bottom plate 23 near the reinforcing ribs may locally deform under the pressure difference to reduce risks of damages to the color steel tile 2 and failure of connection between adjacent color steel tiles 2, thereby prolonging the service life of the color steel tile 2 and improving stability of connection between the adjacent color steel tiles 2 and between the color steel tiles 2 and the roof.

When the adjacent color steel tiles 2 are fixedly connected, the female rib 22 is lapped on the adjacent male rib 21, and the female rib 22 is fixedly connected to the male rib 21 on the adjacent color steel tile 2 by overlocking through an overlocking tool (not labelled in the figure), so as to simplify the connection structure of the adjacent color steel tiles 2, thereby reducing the space required for mounting the color steel tiles 2. An angle α of the overlocking satisfies: $360° \leq \alpha \leq 540°$. For example, the angle of the overlocking may be 400°, 450°, or 500°.

In one or more embodiments, the angle of the overlocking is a bending angle between the male rib 21 and the female rib 22. If the angle of the overlocking is smaller (i.e., $\alpha < 360°$), the male rib 21 and the female rib 22 have poor overlocking strength, and the male rib 21 and the female rib 22 are easily separated under external force, resulting in failure of the connection between the adjacent color steel tiles 2. If the angle of the overlocking is larger (i.e., $\alpha > 540°$), difficulty of the overlocking is increased, which increases the time spent in fixing the adjacent color steel tiles 2.

Therefore, $360° \leq \alpha \leq 540°$ can increase strength of the connection between the male rib 21 and the female rib 22, thereby improving stability of the connection between the adjacent color steel tiles 2, and at the same time, reduce mounting difficulty of the color steel tiles 2 and reduce a mounting cycle of the color steel tiles 2.

In some embodiments, the angle α of the overlocking satisfies: $\alpha = 360°$.

It is defined that the angle of the overlocking is 360°, which can simplify the overlocking difficulty while improving the stability of the connection between the adjacent color steel tiles 2, thereby further reducing the mounting cycle of the color steel tiles 2.

In addition, the color steel tile assembly further includes a protective film. The protective film covers a surface of the color steel tile 2 to prolong the service life of the color steel tile 2.

As shown in FIG. 3 and FIG. 4, the photovoltaic module 1 includes a connecting portion 13 and an unsupported portion 14. The connecting portion 13 is configured to contact the color steel tile assembly, and the unsupported portion 14 is configured to define a cavity 3 with the color steel tile 2. The connecting portion 13 includes a first connecting portion (not labelled in the figure) and a second connecting portion (not labelled in the figure). The first connecting portion is configured to be fixedly connected to the color steel tile 2 assembly. The second connecting portion is configured to abut against the color steel tiles 2.

In one or more embodiments, as shown in FIG. 3, along the first direction X, two sides of the photovoltaic module 1 are respectively bonded to the bending portions 24 on the male rib 21 and the female rib 22 to simplify the way in which the photovoltaic module 1 is connected to the color steel tile 2. In this case, a part of the photovoltaic module 1 for bonding to the bending portion 24 is the first connecting portion.

In other embodiments, as shown in FIG. 4, the color steel tile 2 assembly further includes a clamp 4. Along the first direction X, two ends of the photovoltaic module 1 are respectively connected to the clamp 4. That is, the photovoltaic module 1 is fixed to the color steel tile 2 through the clamp 4. In this case, a part of the photovoltaic module 1 for connection with the clamp 4 is the first connecting portion.

After the photovoltaic module 1 is mounted on the color steel tile 2 through the clamp 4, along the second direction Z, a preset distance exists between the photovoltaic module 1 and the bending portion 24, so that the photovoltaic module 1 can abut against the bending portion 24 when the photovoltaic module 1 locally deforms under the pressure in the second direction Z. In this case, the bending portion 24 can support the photovoltaic module 1, which reduces the risk of damages to the photovoltaic module 1 due to great local deformation. That is, risks of damages to the photovoltaic module 1 due to the stepping during the mounting of the photovoltaic assembly is reduced, the service life of the photovoltaic module 1 is prolonged, and stability of operation of the photovoltaic module 1 is improved, thereby improving anti-stepping performance of the photovoltaic assembly.

In some embodiments, as shown in FIG. 1, the bending portion 24 includes a first bending portion 241 and a second bending portion 242. One end of the second bending portion 242 is connected to the first bending portion 241, and the other end of the second bending portion 242 is connected to the bottom plate 23. The first bending portion 241 extends along the first direction X. Along the second direction Z, a preset distance exists between the photovoltaic module 1 and the first bending portion 241. When the photovoltaic module 1 is under pressure, the photovoltaic module 1 can abut against the first bending portion 241.

In one or more embodiments, when under pressure, the photovoltaic module 1 can abut against the first bending portion 241 extending along the first direction X, so that an abutment surface between the photovoltaic module 1 and the bending portion 24 is a plane extending along the first direction X, which reduces the risk of damages to the photovoltaic module 1 caused by the bending portion 24 due to abutment of the photovoltaic module 1 against a corner of the bending portion 24 and, at the same time, helps to increase the contact area between the photovoltaic module 1 and the bending portion 24, and reduces the risk of insufficient support due to a small contact area between the photovoltaic module 1 and the bending portion 24, thereby improving reliability of support of the bending portion 24 for the photovoltaic module 1.

When the photovoltaic module 1 is not subjected to external force in the second direction Z, a distance L1 between the photovoltaic module 1 and the first bending portion 241 in the second direction Z satisfies: 5 mm$\leq$L1$\leq$20 mm. For example, the distance between the photovoltaic module 1 and the first bending portion 241 in the second direction Z may be 5 mm, 8 mm, 11 mm, 16 mm, 19 mm, or 20 mm.

In one or more embodiments, if the distance between the photovoltaic module 1 and the first bending portion 241 in the second direction Z is shorter, that is, L1<5 mm, under the influence of factors such as machining errors and mounting errors, there is the risk that the photovoltaic module 1 interferes with the first bending portion 241 to cause instability and even failure of the mounting of the photovoltaic module 1. If the distance between the photovoltaic module 1 and the first bending portion 241 in the second direction Z is longer, that is, L1>20 mm, when the photovoltaic module 1 is under pressure, the photovoltaic module 1 is required to produce large deformation to abut against the first bending portion 241, which increases the risk of damages to the photovoltaic module 1. Therefore, 5 mm$\leq$L1$\leq$20 mm can improve stability of the mounting of the photovoltaic module 1 on the color steel tile 2 and, at the same time, reduce the amount of deformation of the photovoltaic module 1 when under pressure and prolong the service life of the photovoltaic module 1.

The distance L1 between the photovoltaic module 1 and the first bending portion 241 satisfies: 10 mm$\leq$L1$\leq$15 mm. That is, the distance between the photovoltaic module 1 and the first bending portion 241 in the second direction Z may be 10 mm, 11 mm, 13 mm, or 15 mm, which further reduces the influence of factors such as machining errors and mounting errors on the stability of the mounting of the photovoltaic module 1 and further improves the supporting effect of the first bending portion 241 on the photovoltaic module 1.

As shown in FIG. 1, along the first direction X, lengths of the male rib 21 and the female rib 22 are both L2, a length of the first bending portion 241 is L3, and L2 and L3 satisfy: 1:5$\leq$L3:L2$\leq$4:5. For example, a length ratio of the first bending portion 241 to the male rib 21 and the female rib 22 may be 1:5, 2:5, 3:5, or 4:5.

During the machining of the color steel tile 2, the lengths of the male rib 21 and the female rib 22 are constant values. If the length of the first bending portion 241 is to be changed, an inclination angle of the second bending portion 242 is required to be adjusted. If the length of the first bending portion 241 is greater, that is, L3:L2>4:5, an angle between an inclination direction of the second bending portion 242 and the second direction Z is smaller, which increases difficulty of the machining of the second bending portion 242. If the length of the first bending portion 241 is smaller, that is, L3:L2<1:5, a size of the second bending portion 242 for supporting the photovoltaic module 1 is smaller, which reduces reliability of the support of the second bending portion 242 for the photovoltaic module 1. Therefore, in one or more embodiments, 1:5$\leq$L3:L2$\leq$4:5 increases the contact area between the second bending portion 242 and the photovoltaic module 1 while reducing difficulty of the machining of the color steel tile 2, thereby improving the reliability of the support of the second bending portion 242 for the photovoltaic module 1.

In some embodiments, the length ratio of the first bending portion 241 to the male rib 21 and the female rib 22 is 3:5, so as to further improve the reliability of the support of the second bending portion 242 for the photovoltaic module 1.

In addition, the color steel tile 2 is provided with a supporting portion. Along the second direction Z, a distance between the supporting portion and the photovoltaic module 1 ranges from 5 mm to 20 mm. When the photovoltaic module 1 is under pressure in the second direction Z, a local structure of the photovoltaic module 1 deforms and abuts against the supporting portion, and the supporting portion can support the photovoltaic module 1, to reduce the risk of damages to the photovoltaic module 1 due to excessive deformation. In this case, a part of the photovoltaic module 1 for abutting against the supporting portion is the second connecting portion.

In one or more embodiments, the supporting portion is an additional part arranged on the color steel tile 2. That is, the supporting portion is fixedly connected to the color steel tile 2.

In other embodiments, the overlock or the crimping portion 25 of the color steel tile 2 is the supporting portion. As shown in FIG. 1, along the second direction Z, a height of the first bending portion 241 is H1, a height of the crimping portion 25 is H2, and H1 and H2 satisfy: 0$\leq$H2–H1$\leq$12 mm. For example, a height difference between crimping portion 25 and the first bending portion 241 may be 1 mm, 3 mm, 6 mm, 11 mm, or 12 mm.

In one or more embodiments, along the first direction X, the crimping portion 25 is located between the male rib 21 and the female rib 22. That is, the crimping portion 25 is located between two adjacent first bending portions 241. If the crimping portion 25 is lower than the first bending portions 241, after the photovoltaic module 1 is mounted on the color steel tile 2, the photovoltaic module 1 between the two adjacent first bending portions 241 is in an unsupported state, and the unsupported area of the photovoltaic module 1 is relatively large. When the photovoltaic module 1 is subjected to external force in the second direction Z, the photovoltaic module 1 between the two adjacent first bending portions 241 deforms greatly, thereby increasing the risk of damages to the photovoltaic module 1. If the height difference between the crimping portion 25 and the first bending portion 241 is greater, that is, H2–H1>12 mm, when the photovoltaic module 1 is mounted on the color steel tile 2, a distance between the photovoltaic module 1 and the crimping portion 25 is smaller, and there is a risk that the photovoltaic module 1 interferes with the crimping portion 25 under the influence of factors such as machining errors and mounting errors. That is, there is a risk that the crimping portion 25 lifts up the photovoltaic module 1 along the second direction Z, thereby increasing the risk of damages to the photovoltaic module 1. Therefore, the height difference between the crimping portion 25 and the first bending portion 241 satisfies: $0 \leq H2-H1 \leq 12$ mm, so that the height of the crimping portion 25 is equal to or greater than that of the first bending portion 241, and after the photovoltaic module 1 is mounted on the color steel tile 2, if the photovoltaic module 1 is under pressure in the second direction Z, the crimping portion 25 can abut against the photovoltaic module 1. That is, the crimping portion 25 can support the photovoltaic module 1, which reduces the risk of damages to the photovoltaic module 1 between the two adjacent first bending portions 241, thereby further prolonging the service life of the photovoltaic module 1.

The height of the first bending portion 241 and the height of the crimping portion 25 satisfy: $3 \text{ mm} \leq H2-H1 \leq 6$ mm, so as to further improve the stability of the support of the crimping portion 25 for the photovoltaic module 1, thereby further prolonging the service life of the photovoltaic module 1. In some embodiments, the height difference between the crimping portion 25 and the first bending portion 241 may be 3 mm, 4.6 mm, 5.5 mm, or 6 mm.

Figure 2:
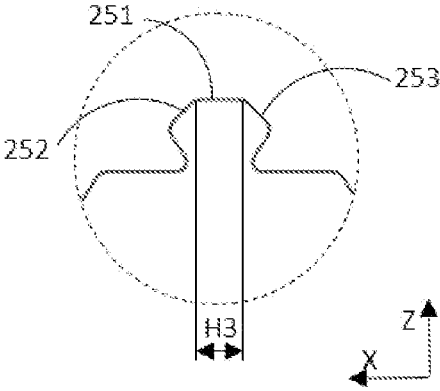
FIG. 2 is an enlarged view of Part I in FIG. 1.

In some embodiments, as shown in FIG. 2, the crimping portion 25 includes a first wall 251 extending along the first direction X, and a width H3 of the first wall 251 satisfies: $10 \text{ mm} \leq H3 \leq 100$ mm. For example, the width of the first wall 251 may be 10 mm, 26 mm, 44 mm, 44 mm, 78 mm, 90 mm, or 100 mm.

In one or more embodiments, when the photovoltaic module 1 is subjected to external force in the second direction Z, the first wall 251 of the crimping portion 25 can abut against the photovoltaic module 1 to support the photovoltaic module 1. If the width of the first wall 251 is smaller, that is, H3<10 mm, the contact area between the crimping portion 25 and the photovoltaic module 1 is smaller, and supporting force of the corner portion 25 on the photovoltaic module 1 is less, which increases stress at an edge position where the photovoltaic module 1 abuts against the first wall 251 and thus increases the risk of damages to the photovoltaic module 1. If the width of the first wall 251 is greater, that is, H3>100 mm, machining difficulty of the crimping portion 25 is increased, thereby increasing machining costs of the color steel tile 2. Therefore, $10 \text{ mm} \leq H3 \leq 100$ mm can improve reliability of the support of the crimping portion 25 for the photovoltaic module 1 and reduce the machining costs of the color steel tile 2.

Figure 5:
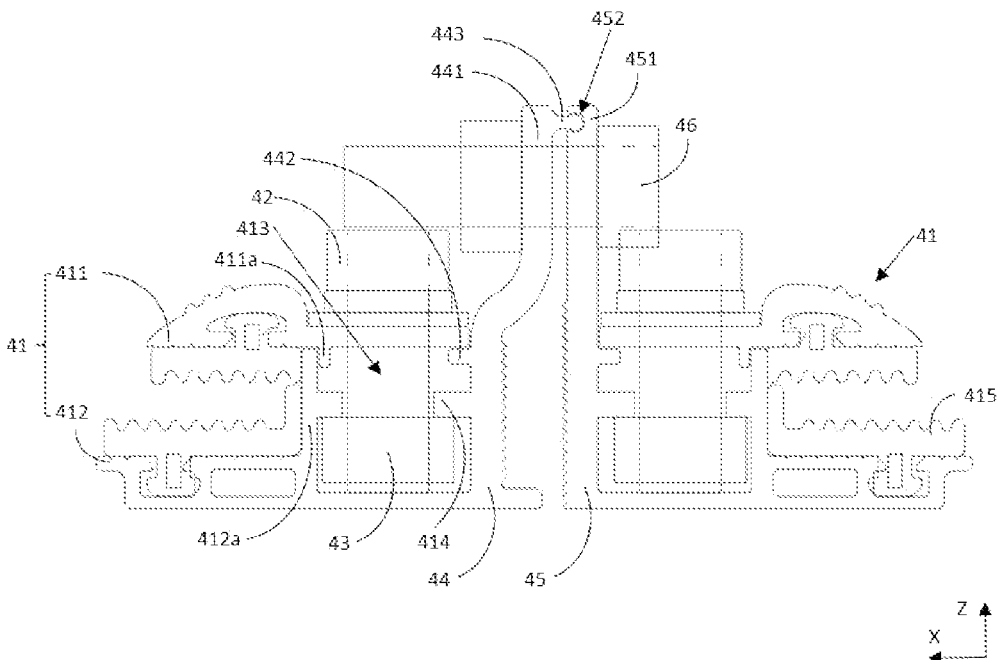
FIG. 5 is a schematic structural diagram showing connection of a clamp in FIG. 4 according to one or more embodiments of the present disclosure.

As shown in FIG. 4 and FIG. 5, the clamp 4 includes a clamping assembly 41, the clamping assembly 41 includes a first clamping piece 411 and a second clamping piece 412 arranged opposite to each other along the second direction Z, and the clamp 4 clamps and secures the photovoltaic module 1 through the first clamping piece 411 and the second clamping piece 412.

In one or more embodiments, the clamp 4 clamps the photovoltaic module 1 through the first clamping piece 411 and the second clamping piece 412, which simplifies the way in which the clamp 4 is connected to the photovoltaic module 1, thereby simplifying the structure of the clamp 4 and reducing manufacturing costs of the clamp 4. At the same time, mounting and disassembly of the photovoltaic module 1 on the clamp 4 are facilitated, and disassembly and assembly processes of the photovoltaic module 1 are simplified, thereby shortening the assembling cycle of the photovoltaic assembly.

Along the first direction X and/or the third direction Y, a plurality of clamps 4 are spaced apart on the two sides of the photovoltaic module 1 to improve stability of the connection between the photovoltaic module 1 and the color steel tile 2. When the photovoltaic module 1 is subjected to external force along the second direction Z, the photovoltaic module 1 can abut against part of the first bending portion 241 between adjacent clamps 4.

In some embodiments, along the second direction Z, the second clamping piece 412 is located between the first clamping piece 411 and the bending portion 24, and a minimum distance L4 between the second clamping piece 412 and the bending portion 24 satisfies: $0 \leq L4 \leq 6$ mm. That is, along the second direction Z, a minimum vertical distance between the second clamping piece 412 and the first bending portion 241 is L4. For example, L4 may be 0 mm, 1 mm, 3.6 mm, 4 mm, or 6 mm.

In one or more embodiments, when L4=0, the second clamping piece 412 abuts against the first bending portion 241. After the photovoltaic module 1 is mounted on the clamp 4, the first bending portion 241 can support the second clamping piece 412, which reduces the risk of deformation of and even damages to the second clamping piece 412 under the action of gravity of the photovoltaic module 1 and the external force along the second direction Z, thereby improving structural strength of the second clamping piece 412 and then prolonging the service life of the second clamping piece 412. When a gap of 0 to 6 mm exists between the second clamping piece 412 and the first bending portion 241, the influence of factors such as machining errors and mounting errors can be reduced, thereby reducing the risk of deformation of and damages to the second clamping piece 412 and the first bending portion 241 caused by interference of the second clamping piece 412 with the first bending portion 241 after the clamp 4 is connected to the lock seam, improving stability of structures of the second clamping piece 412 and the first bending portion 241, and improving reliability of the support of the second clamping piece 412 and the first bending portion 241 for the photovoltaic module 1. If L4>6 mm, the distance between second clamping piece 412 and the first bending portion 241 is greater, so that a distance between the photovoltaic module 1 and the first bending portion 241 is greater, increasing the risk of damages to the photovoltaic module 1. Therefore, $0 \leq L4 \leq 6$ mm improves the stability of the structures of the second clamping piece 412 and the first bending portion 241, prolongs the service life of the second clamping piece 412 and the first bending portion 241, and improves the reliability of the support of the second clamping piece 412 and the first bending portion 241 for the photovoltaic module 1.

As shown in FIG. 5, the clamp 4 further includes a first regulating member 42, and the first clamping piece 411 and the second clamping piece 412 are detachably connected through the first regulating member 42.

In one or more embodiments, the first clamping piece 411 and the second clamping piece 412 are designed in a split manner. The first clamping piece 411 can move relative to the second clamping piece 412. That is, the first regulating member 42 can regulate a distance between the first clamping piece 411 and the second clamping piece 412. During the mounting of the photovoltaic module 1, the distance between the first clamping piece 411 and the second clamping piece 412 is increased first through the first regulating member 42, so as to facilitate the photovoltaic module 1 to extend between the first clamping piece 411 and the second clamping piece 412. When the photovoltaic module 1 extends to an appropriate position between the first clamping piece 411 and the second clamping piece 412, the distance between the first clamping piece 411 and the second clamping piece 412 is reduced through the first regulating member 42, to realize clamping and fixing of the photovoltaic module 1. The detachable connection between the first clamping piece 411 and the second clamping piece 412 through the first regulating member 42 simplifies a manner in which the clamp 4 is connected to the color steel tile 2, which is conducive to shortening the mounting cycle of the photovoltaic module 1, and, at the same time, is conducive to simplifying the structure of the clamp 4 and reducing machining costs of the clamp 4.

The first regulating member 42 includes, but is not limited to, structures such as screws and bolts. A specific structure type of the first regulating member 42 is not limited in the embodiments of the present disclosure.

In addition, as shown in FIG. 5, the first clamping piece 411 and/or the second clamping piece 412 are/is provided with a gasket 415. For example, the first clamping piece 411 and the second clamping piece 412 are each provided with the gasket 415, the first clamping piece 411 and the second clamping piece 412 are connected to the photovoltaic module 1 through the gaskets 415. The gaskets 415 may be rubber members. When the first clamping piece 411 and the second clamping piece 412 clamp the photovoltaic module 1, the gaskets 415 can play a role of buffering and protecting the photovoltaic module 1, reducing the possibility of hard contact between the photovoltaic module 1 and the first clamping piece 411 and between the photovoltaic module 1 and the second clamping piece 412, thereby reducing the possibility of explosion of or other damages to the photovoltaic module 1 and helping to prolong the service life of the photovoltaic module 1.

In some embodiments, as shown in FIG. 4 and FIG. 5, the first clamping piece 411 and the second clamping piece 412 define an accommodating cavity 413. A limit portion 414 is arranged on a side wall of the accommodating cavity 413. The clamp 4 further includes a limit member 43. The limit member 43 is located in the accommodating cavity 413, and the limit member 43 is connected to the first regulating member 42. When the clamping assembly 41 clamps the photovoltaic module 1, the limit member 43 abuts against the limit portion 414.

In one or more embodiments, description is provided based on an example in which the first regulating member 42 is a bolt and the limit member 43 is provided with a threaded hole. When the first regulating member 42 regulates the distance between the first clamping piece 411 and the second clamping piece 412 to clamp the photovoltaic module 1, the limit member 43 can be driven by the first regulating member 42 to move along the second direction Z toward the first clamping piece 411. After the limit member 43 abuts against the limit portion 414, the first clamping piece 411 has one side abutting against the first regulating member 42 and the other side abutting against an extension arm 412a of the second clamping piece 412 extending along the second direction Z. In this case, the first clamping piece 411 is fixed under the actions of the first regulating member 42, the extension arm 412a, the limit member 43, and the limit portion 414. Therefore, the arrangement of the limit member 43 can simplify connection structures among the first clamping piece 411, the second clamping piece 412, and the first regulating member 42, thereby simplifying an overall structure of the clamp 4 and reducing the costs of the clamp 4. The fixing of the first clamping piece 411 and the second clamping piece 412 through the limit member 43 and the first regulating member 42 reduces the risk of failure of the connection between the photovoltaic module 1 and the color steel tile 2 caused by relative movement between the first clamping piece 411 and the second clamping piece 412 during mounting, transportation, and use, thereby improving stability of the clamping of the photovoltaic module 1 by the first clamping piece 411 and the second clamping piece 412.

In one or more embodiments, as shown in FIG. 5, an outer contour of the limit member 43 is in the shape of a circle, a rectangle, a pentagon, or other regular shapes, the limit member 43 includes an upper surface (not labelled in the figure) and a lower surface (not labelled in the figure) arranged opposite to each other along the second direction Z, and the limit portion 414 directly abuts against the upper surface or the low surface, so as to simplify the structure of the limit member 43.

In addition, as shown in FIG. 5, the first clamping piece 411 is provided with a first protruding portion 411a extending along the second direction Z. The first protruding portion 411a can abut against the extension arm 412a to limit movement of the first clamping piece 411 in relative to the second clamping piece 412 along the first direction X, thereby improving reliability of the connection between the first clamping piece 411 and the second clamping piece 412.

Figure 6:
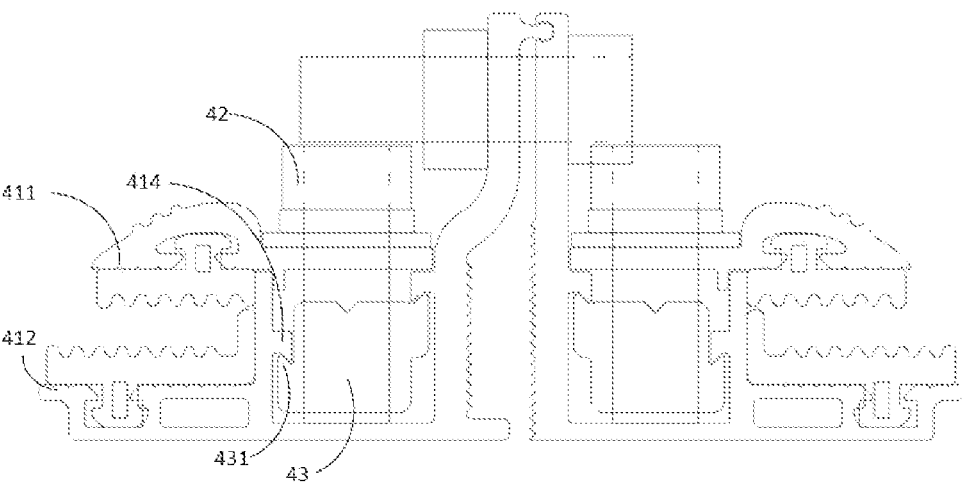
FIG. 6 is a schematic structural diagram of a connection structure of the clamp in FIG. 4 according to some other embodiments of the present disclosure.
Figure 6:
Figure 7:
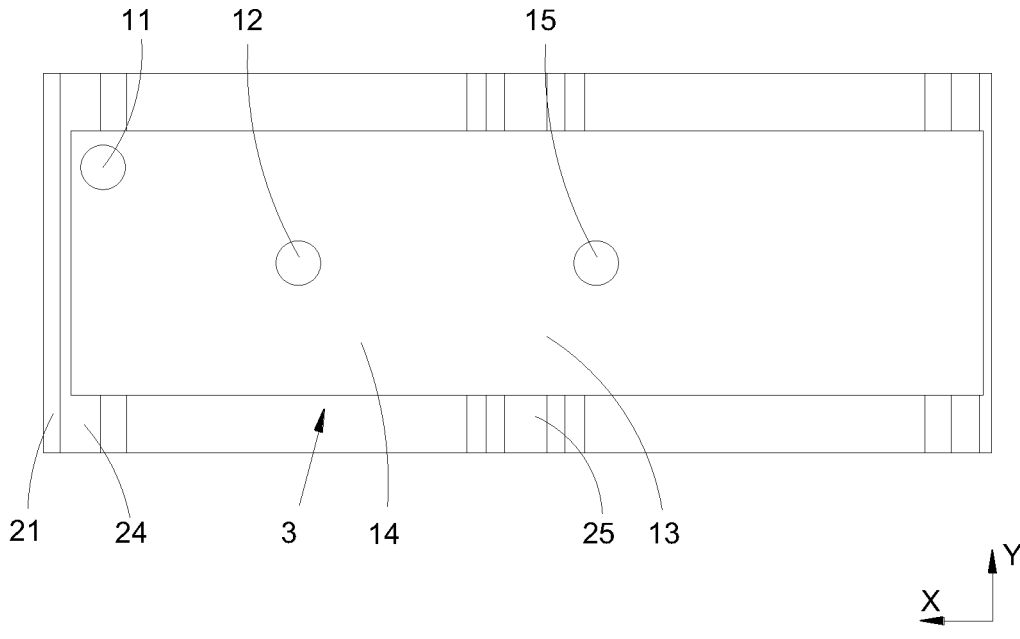
FIG. 7 is a top view of a local structure of FIG. 3.

In other embodiments, as shown in FIG. 6, the limit member 43 is provided with a protruding limit fit portion 441. The limit fit portion 441 can be snap-fit with the limit portion 414 to improve stability of the connection between the limit member 43 and the limit portion 414.

As shown in FIG. 5, along the first direction X, the clamp 4 includes a first clamping body 44 and a second clamping body 45. The first clamping body 44 and the second clamping body 45 abut against two sides of the lock seam, respectively. The first clamping body 44 is detachably connected to the second clamping body 45.

In one or more embodiments, the clamping of the lock seam through the first clamping body 44 and the second clamping body 45 can reduce the risk of separation of the male rib 21 from the female rib 22 on the adjacent color steel tile 2 under external force, thereby improving stability of the connection between the adjacent color steel tiles 2. The detachable connection between the first clamping body 44 and the second clamping body 45 can facilitate mounting, disassembly, and replacement of the first clamping body 44 and the second clamping body 45, thereby reducing mounting and maintenance costs of the first clamping body 44 and the second clamping body 45.

In some embodiments, as shown in FIG. 5, one end of the first clamping body 44 away from the lock seam is provided with a first extension portion 441 extending along the second direction Z, and one end of the second clamping body 45 away from the lock seam is provided with a second extension portion 451 extending along the thickness direction of the color steel tile 2. The clamp 4 further includes a second regulating member 46. The first extension portion 441 and the second extension portion 451 are detachably connected through the second regulating member 46.

In one or more embodiments, the first extension portion 441 and the second extension portion 451 are detachably connected through the second regulating member 46, so that a distance between the first extension portion 441 and the second extension portion 451 can be regulated through the second regulating member 46, thereby realizing adjustment of a distance between the entire first clamping body 44 and the entire second clamping body 45. During the mounting of the clamp 4, the distance between the first clamping body 44 and the second clamping body 45 is increased first through the second regulating member 46, so as to facilitate the lock seam to extend between the first clamping body 44 and the second clamping body 45. When the lock seam extends to an appropriate position between the first clamping body 44 and the second clamping body 45, the distance between the first clamping body 44 and the second clamping body 45 is reduced through the second regulating member 46, to realize clamping and fixing of the lock seam. The detachable connection between the first clamping body 44 and the second clamping body 45 through the second regulating member 46 simplifies the way in which the clamp 4 is connected to the lock seam, which is conducive to shortening a mounting cycle of the clamp 4 and, at the same time, is conducive to simplifying the structure of the clamp 4 and reducing the machining costs of the clamp 4.

In addition, as shown in FIG. 5, the first extension portion 441 is provided with a snapping portion 443, and the second extension portion 451 is provided with a snap-fit portion 452. The snapping portion 443 can abut against a side wall of the snap-fit portion 452 to limit relative movement of the first clamping body 44 and the second clamping body 45, thereby improving accuracy of the connection position between the first clamping body 44 and the second clamping body 45 and improving reliability of the connection of the first clamping body 44 and the second clamping body 45 with the lock seam.

In one or more embodiments, the clamping assembly 41 is arranged on the first clamping body 44 or the second clamping body 45. That is, one side of the clamp 4 can clamp the photovoltaic module 1. In other embodiments, as shown in FIG. 5 and FIG. 6, the first clamping body 44 and the second clamping body 45 are each provided with the clamping assembly 41. That is, two sides of the clamp 4 can clamp the photovoltaic module 1. In some embodiments of the present disclosure, the first clamping body 44 and the second clamping body 45 are each provided with the clamping assembly 41.

As shown in FIG. 5 and FIG. 6, the second clamping piece 412 is fixedly connected to or integrally formed with the first clamping body 44 and the second clamping body 45. The first clamping body 44 and the second clamping body 45 are each provided with a second protruding portion 442 extending along the first direction X. When the first clamping piece 411 is fixedly connected to the second clamping piece 412, the first clamping piece 411 has one side abutting against the extension arm 412*a* and the other side abutting against second protruding portion 442, which reduces the risk of inclination of the first clamping piece 411 during the mounting, transportation, and use, thereby improving stability of the connection between the first clamping piece 411 and the second clamping piece 412.

In any one of the above embodiments, as shown in FIG. 3 and FIG. 4, the support 5 includes a first support 51 and a second support 52. The first support 51 has one end fixedly connected to the male rib 21 and the female rib 22 on the adjacent color steel tile 2 by means of overlocking and the other end fixedly connected to the roof. The second support 52 has one end fixedly connected to the crimping portion 25 and the other end fixedly connected to the roof.

As shown in FIG. 2, along the first direction X, the crimping portion 25 includes a second wall 252 and a third wall 253 arranged opposite to each other on two sides of the first wall 251. Contours of the second wall 252 and the third wall 253 are in shapes of V. A part of the second support 52 extends into the crimping portion 25 and abuts against the second wall 252 and the third wall 253 to realize fixed connection between the second support 52 and the crimping portion 25.

During the mounting of the photovoltaic assembly, an operator needs to walk on the surface of the photovoltaic module 1. In this case, the first connecting portion, the second connecting portion, and the unsupported portion 14 of the photovoltaic module 1 and corners of the photovoltaic module 1 may be subjected to greater stress. Therefore, before the photovoltaic module 1 is put into mass production and use, there is a need to step on the connecting portion 13 and the unsupported portion 14 of the photovoltaic module 1 and the corners of the photovoltaic module 1 for testing, so as to adjust and replace the material and the manufacturing process of the photovoltaic module 1, etc., so that the photovoltaic module 1 has stronger anti-stepping performance, thereby prolonging the service life of the photovoltaic module 1.

Figure 11:
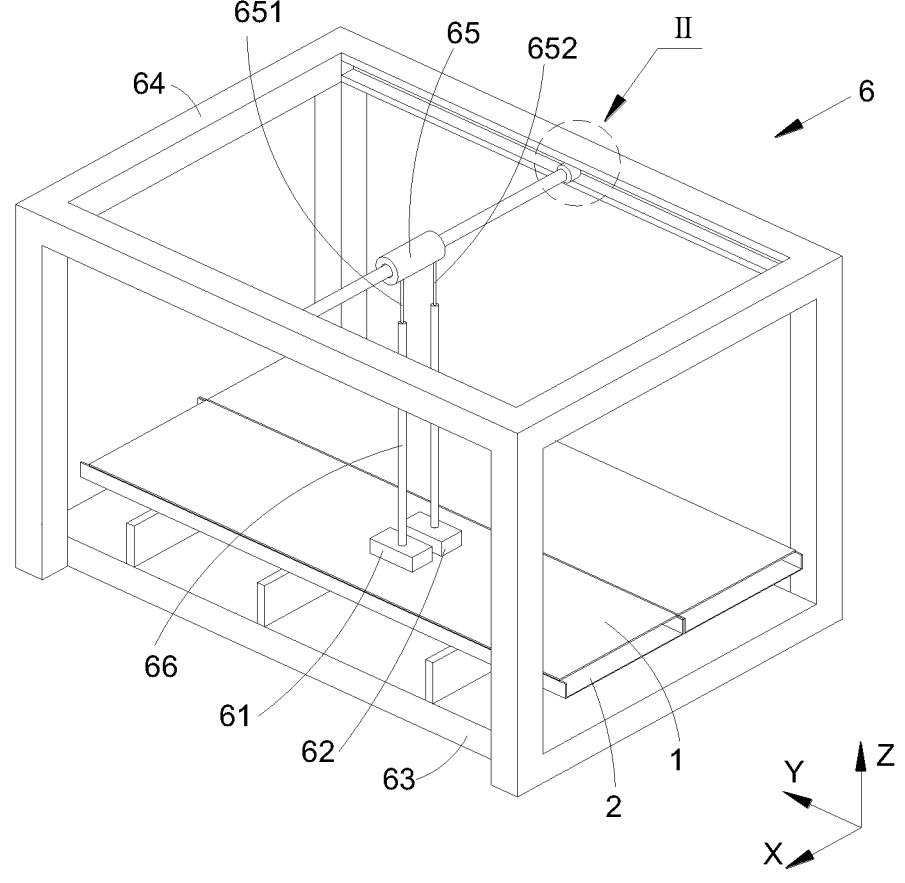
FIG. 11 is a schematic structural diagram of a test device according to one or more embodiments of the present disclosure.
Figure 12:
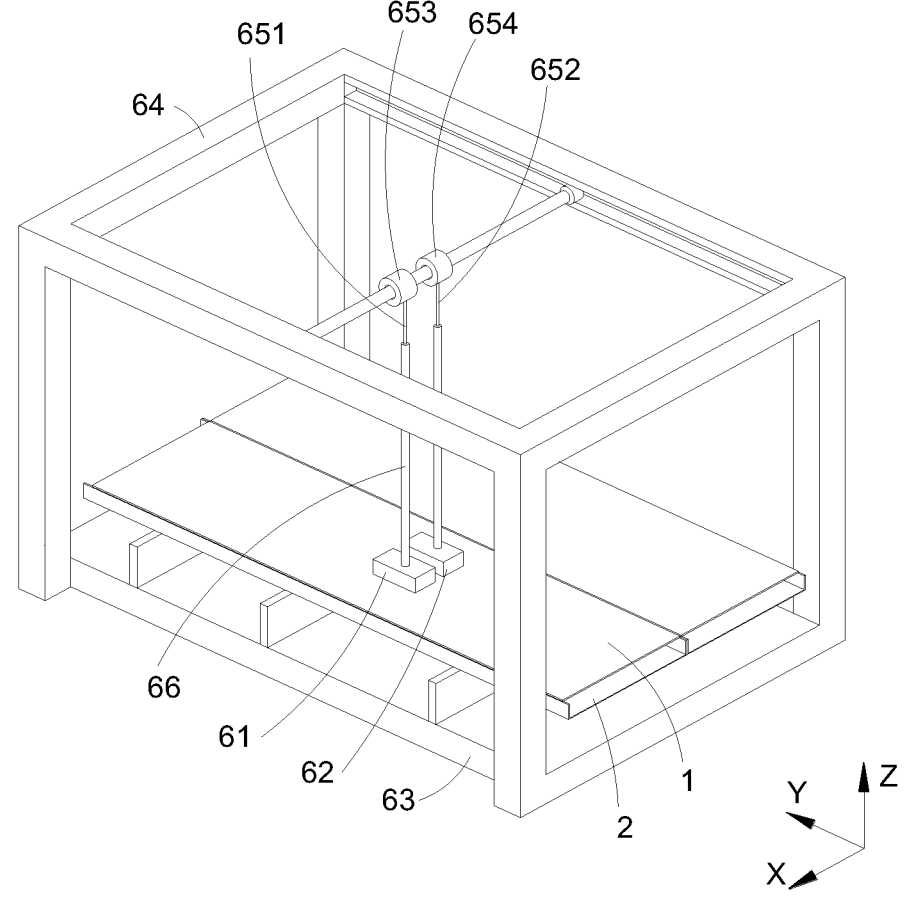
FIG. 12 is a schematic structural diagram of the test device according to some other embodiments of the present disclosure.
Figure 13:
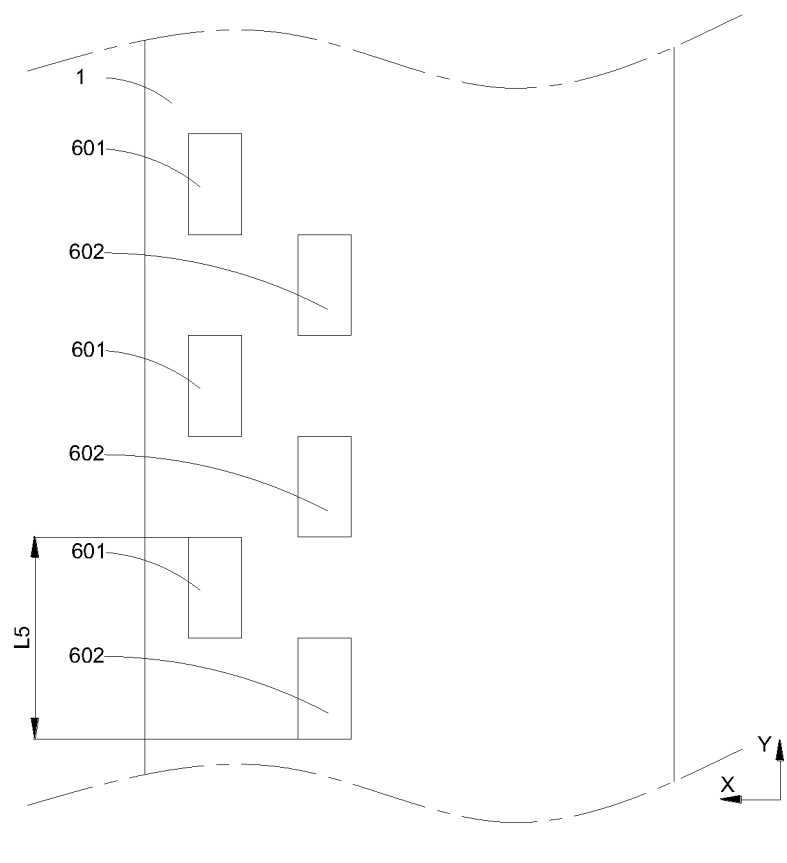
FIG. 13 is a schematic diagram of a test path of the test device on a surface of the photovoltaic module according to one or more embodiments of the present disclosure.

To this end, some embodiments of the present disclosure provide a test device 6 for testing anti-stepping performance of the photovoltaic module 1. As shown in FIG. 11 and FIG. 12, the test device includes a test member. The test member includes a first test member 61 and a second test member 62 spaced apart along a first direction X. The first test member 61 and the second test member 62 are configured to abut against the photovoltaic module 1 and apply a preset load to the photovoltaic module 1. As shown in FIG. 13, the first test member 61 is at a first position 601 when the first test member 61 abuts against the photovoltaic module 1, and the second test member 62 is at a second position 602 when the second test member 62 abuts against the photovoltaic module 1. Along a movement direction of the first test member 61 and the second test member 62 in a horizontal plane, the first position 601 and the second position 602 are alternately arranged and spaced apart from one another, and a distance L5 between the first position 601 and the adjacent second position 602 satisfies: 400 mm≤L5≤800 mm. The first direction X is a length direction or a width direction of the photovoltaic module 1. In some embodiments of the present disclosure, the first direction X is the width direction of the photovoltaic module 1. In addition, as shown in FIG. 11, the test device further includes a second direction Z and a third direction Z. The second direction Z is a thickness direction of the photovoltaic module 1, and the third direction Y is the length direction of the photovoltaic module 1. In some embodiments of the present disclosure, the movement direction of the first test member 61 and the second test member 62 in the horizontal plane is the third direction Y.

In one or more embodiments, the first test member 61 and the second test member 62 apply the preset load to the photovoltaic module 1, and the first position 601 and the second position 602 are alternately spaced apart along the movement direction of the first test member 61 and the second test member 62 in the horizontal plane. That is, the first test member 61 and the second test member 62 respectively simulate left and right feet of the operator to simulate the force applied on the photovoltaic module 1 when the operator walks on the surface of the photovoltaic module 1, so as to easily adjust and replace the material and the manufacturing process of the photovoltaic module 1 according to test results, so that the photovoltaic module 1 has stronger anti-stepping performance, thereby prolonging the service life of the photovoltaic module 1.

If the distance between the first position 601 and the adjacent second position 602 is shorter, that is, L5<400 mm, or if the distance between the first position 601 and the adjacent second position 602 is longer, that is, L5>800 mm, the distance between the first position 601 and the adjacent second position 602 is quite different from walking step distance of the operator, which reduces reliability of the test results. Therefore, 400 mm≤L5≤800 mm enables the distance between the first position 601 and the adjacent second position 602 to match the step distance of the operator, which increases accuracy and reliability of the test results of the test device, thereby improving operation performance of the test device.

Figures 14, 15:
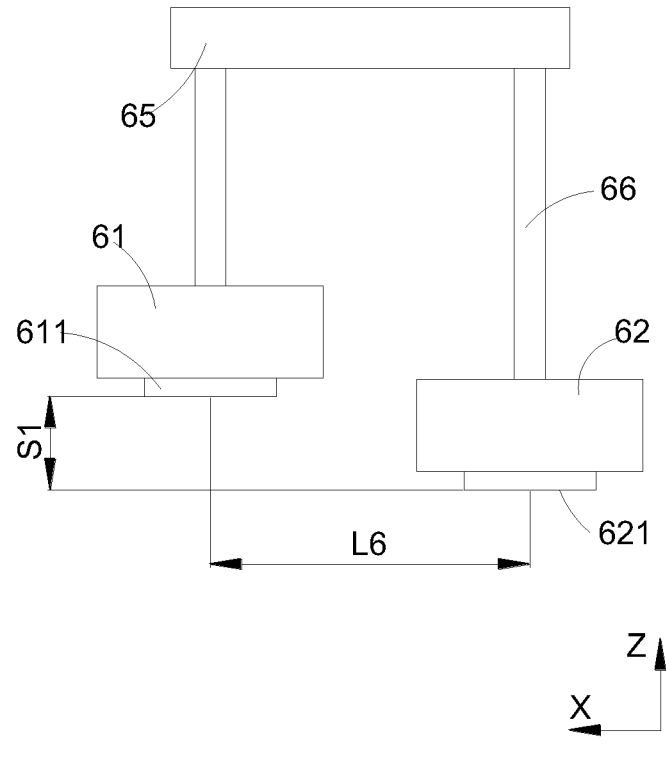
FIG. 14 is a front view of a first test member and a second test member in FIG. 11 in a second direction.
FIG. 15 is a bottom view of the first test member in FIG. 14.

In some embodiments, as shown in FIG. 14, the first test member 61 is provided with a first abutment surface 611 for abutting against the photovoltaic module 1, and the second test member 62 is provided with a second abutment surface 621 for abutting against the photovoltaic module 1. Along the first direction X, a distance L6 between a geometric center of the first abutment surface 611 and a geometric center of the second abutment surface 621 satisfies: 100 mm≤L6≤500 mm, which may be, for example, 10 mm, 150 mm, 360 mm, 480 mm, or 500 mm.

In one or more embodiments, if the distance between the geometric center of the first abutment surface 611 and the geometric center of the second abutment surface 621 is greater or less, that is, L6>500 mm or L6<10 mm, the distance between the first test member 61 and the second test member 62 in the first direction X is quite different from the distance between the operator's two feet, which easily leads to large deviations in the test results of the test device. Therefore, 10 mm≤L5≤500 mm enables the distance between the first test member 61 and the second test member 62 in the first direction X to match the distance between the operator's two feet, which is conducive to improving accuracy and reliability of the test results of the test device.

An area of the first abutment surface 611 ranges from 50 $cm^2$ to 200 $cm^2$. For example, the area of the first abutment surface 611 may be 50 $cm^2$, 112 $cm^2$, 150 $cm^2$, 163 $cm^2$, or 200 $cm^2$. An area of the second abutment surface 621 ranges from 50 $cm^2$ to 200 $cm^2$. In some embodiments, the area of the second abutment surface 621 may be 50 $cm^2$, 112 $cm^2$, 150 $cm^2$, 163 $cm^2$, or 200 $cm^2$.

In one or more embodiments, if the area of the first abutment surface 611 and the area of the second abutment surface 621 are smaller, when the preset load is applied to the photovoltaic module 1 through the first abutment surface 611 and the second abutment surface 621, the pressure on the photovoltaic module 1 is greater, which is quite different from the pressure exerted by the operator on the photovoltaic module 1 during the actual mounting, reducing the reliability of the test results. If the area of the first abutment surface 611 and the area of the second abutment surface 621 are larger, when the preset load is applied to the photovoltaic module 1 through the first abutment surface 611 and the second abutment surface 621, the pressure on the photovoltaic module 1 is less, which reduces the reliability of the test results. Therefore, the area of the first abutment surface 611 ranges from 50 $cm^2$ to 200 $cm^2$ and the area of the second abutment surface 621 ranges from 50 $cm^2$ to 200 $cm^2$, which improves accuracy and reliability of the test results of the photovoltaic module 1. When the area of the first abutment surface 611 and the area of the second abutment surface 621 are smaller, standing of a person with a small foot size on the photovoltaic module 1 may be simulated, or standing of the operator on tiptoe on the photovoltaic module 1 may be simulated, that is, the operator's sole or heel is in contact with the photovoltaic module 1, or, standing of the operator on one foot on the surface of the photovoltaic module 1 may be simulated, so as to improve the testable range of the test device.

In one or more embodiments, a contour shape of the first abutment surface 611 and a contour shape of the second abutment surface 621 are similar to a contour shape of the operator's shoe sole, to improve accuracy and reliability of the test results of the test device. In one or more embodiments, the contour shape of the first abutment surface 611 and the contour shape of the second abutment surface 621 constitute the complete contour of the shoe sole, to increase the degree of matching between the contour shapes of the first abutment surface 611 and the second abutment surface 621 and the contour shape of the shoe sole. In other embodiments, the contour shape of the first abutment surface 611 and the contour shape of the second abutment surface 621 are similar to the contour shape of a sole or a heel of the shoe sole. In other embodiments, the first abutment surface 611 includes a first surface 6111 and a second surface 6112 spaced apart along the third direction Y, the contour shape of the first surface 6111 is similar to the contour shape of a forefoot of the shoe sole, and the contour shape of the second surface 6112 correlatively matches the contour shape of a rear heel of the shoe sole. The second abutment surface 621 includes a third surface 6211 and a fourth surface 6212 spaced apart along the third direction Y, the contour shape of the third surface 6211 is similar to the contour shape of the forefoot of the shoe sole, and the contour shape of the fourth surface 6212 correlatively matches the contour shape of the rear heel of the shoe sole, so as to reduce machining costs of the test member.

In other embodiments, the contour shape of the first abutment surface 611 and the contour shape of the second abutment surface 621 are circles, rectangles, ovals, or other shapes, so as to facilitate machining of the test member, thereby reducing the machining costs of the test member. In one or more embodiments, the first abutment surface 611 and the second abutment surface 621 are complete and continuous planes extending along the third direction Y. In other embodiments, the first abutment surface 611 includes a first surface 6111 and a second surface 6112 spaced apart along the third direction Y, the contour shape of the first surface 6111 and the contour shape of the second surface 6112 are circles, rectangles, ovals, or other shapes, and the second abutment surface 621 includes a third surface 6211 and a fourth surface 6212 spaced apart along the third direction Y, the contour shape of the third surface 6211 and the contour shape of the fourth surface 6212 are circles, rectangles, ovals, or other shapes, so as to reduce materials required for machining the test member, thereby reducing the machining costs of the test member.

Figure 16:
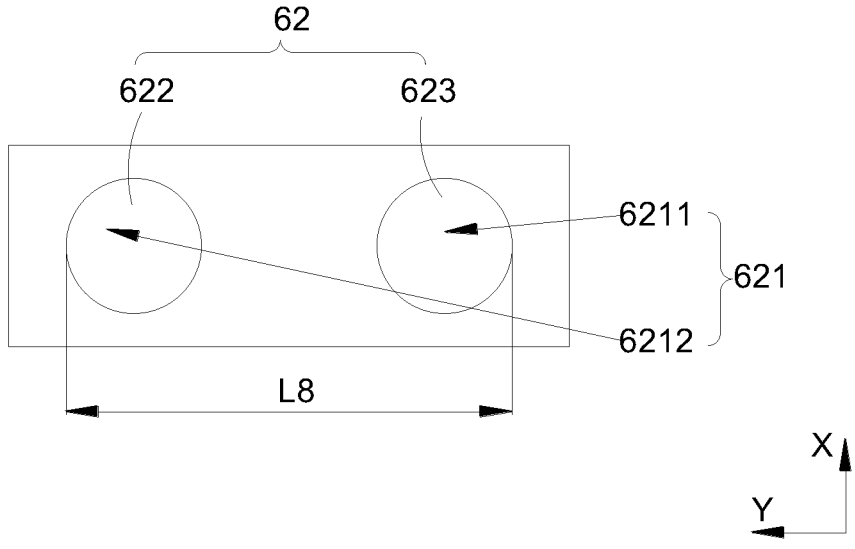
FIG. 16 is a bottom view of the second test member in FIG. 14.

In some embodiments of the present disclosure, the first abutment surface 611 includes a first surface 6111 and a second surface 6112 spaced apart along the third direction Y, the contour shape of the first surface 6111 and the contour shape of the second surface 6112 are circles. The second abutment surface 621 includes a third surface 6211 and a fourth surface 6212 spaced apart along the third direction Y, the contour shape of the third surface 6211 and the contour shape of the fourth surface 6212 are circles. As shown in FIG. 15, the first test member 61 includes a first body 612 and a second body 613 arranged opposite to each other along the third direction Y, the first surface 6111 is arranged on the first body 612, and the second surface 6112 is arranged on the second body 613. As shown in FIG. 16, the second test member 62 includes a third body 622 and a fourth body 623 arranged opposite to each other along the third direction Y, the third surface 6211 is arranged on the third body 622, and the four surface 6212 is arranged on the fourth body 623.

As shown in FIG. 15, along the movement direction of the first test member 61 in the horizontal plane, a length L7 of the first abutment surface 611 satisfies: 10 mm≤L7≤400 mm. That is, a maximum distance between an outer contour of the first surface 6111 and an outer contour of the second surface 6112 in the third direction Y ranges from 10 mm to 400 mm. In some embodiments, the maximum distance between the outer contour of the first surface 6111 and the outer contour of the second surface 6112 in the third direction Y may be 10 mm, 146 mm, 259 mm, 372 mm, or 400 mm. In other embodiments, as shown in FIG. 16, along the movement direction of the second test member 62 in the horizontal plane, a length L8 of the second abutment surface 621 satisfies: 10 mm≤L8≤400 mm. That is, a maximum distance between an outer contour of the third surface 6211 and an outer contour of the fourth surface 6212 in the third direction Y ranges from 10 mm to 400 mm. For example, the maximum distance between the outer contour of the third surface 6211 and the outer contour of the fourth surface 6212 in the third direction Y may be 10 mm, 146 mm, 259 mm, 372 mm, or 400 mm.

In one or more embodiments, if the length of the first abutment surface 611 in the third direction Y is larger and the length of the second abutment surface 621 in the third direction Y is larger, that is, L7>400 mm and L8>400 mm, or the length of the first abutment surface 611 in the third direction Y is smaller and the length of the second abutment surface 621 in the third direction Y is smaller, that is, L7<10 mm and L8<10 mm, contour dimensions of the first abutment surface 611 and the second abutment surface 621 are quite different from contour dimensions of the operator's shoe sole, which easily leads to large deviations in the test results of the test device. Therefore, 10 mm≤L7≤400 mm and 10 mm≤L8≤400 mm enable the contour dimensions of the first abutment surface 611 and the second abutment surface 621 in the third direction Y to match the contour dimensions of the operator's shoe sole, which is conducive to improving the accuracy and reliability of the test results of the test device.

In any one of the above embodiments, a weight W1 of the first test member 61 satisfies: 50 KG≤W1≤160 KG. That is, the preset load applied by the first test member 61 to the photovoltaic module 1 ranges from 50 KG to 160 KG. For example, the weight of the first test member 61 may be 50 KG, 96 KG, 122 KG, or 160 KG. A weight W2 of the second test member 62 satisfies: 50 KG≤W2≤160 KG. That is, the preset load applied by the second test member 62 to the photovoltaic module 1 ranges from 50 KG to 160 KG. In some embodiments, the weight of the second test member 62 may be 50 KG, 96 KG, 122 KG, or 160 KG.

When the operator stands on the surface of the photovoltaic module 1 to perform mounting, there are situations where the operator carries a mounting tool, transports the photovoltaic module 1, etc. If the weight of the first test member 61 is lower and the weight of the second test member 62 is lower, that is, W1<50 KG and W2<50 KG, the weights the first test member 61 and the second test member 62 are quite different from the weight of the operator, thereby leading to poor reliability of the test results. If the weight of the first test member 61 is higher and the weight of the second test member 62 is higher, that is, W1>160 KG and W2>160 KG, the weights the first test member 61 and the second test member 62 are quite different from the weight of the operator, and at the same time, machining costs of the first test member 61 and the second test member 62 are increased. Therefore, in one or more embodiments, 50 KG≤W1≤160 KG and 50 KG≤W2≤160 KG can improve reliability of the test results of the test device and reduce machining costs of the test member.

The weight of the first test member 61 is equal to that of the second test member 62, that is, W1=W2, thereby further improving the accuracy of the test results of the test device.

In any one of the above embodiments, buffers (not labelled in the figure) are mounted on the first abutment surface 611 and the second abutment surface 621. During the test, the first abutment surface 611 and the second abutment surface 621 respectively abut against the photovoltaic module 1 through the buffers, which reduces the risk of damages to the photovoltaic module 1, the first abutment surface 611, and the second abutment surface 621 caused by direct contact of the first abutment surface 611 and the second abutment surface 621 with the surface of the photovoltaic module 1. At the same time, the buffers can simulate the operator's insole to improve accuracy and reliability of the test results.

The buffers may be made of silicone, plastics, and other materials capable of good elastic deformation. The specific materials of the buffers are not limited in the present disclosure.

As shown in FIG. 11 and FIG. 12, the test device includes a base 63. In one or more embodiments, before the test device tests anti-stepping performance of the photovoltaic module 1, the photovoltaic module 1 is directly placed on the base 63, so as to shorten the mounting cycle of the photovoltaic module 1 and the test device, thereby shortening the test cycle of the anti-stepping performance of the photovoltaic module 1. In other embodiments, as shown in FIG. 11 and FIG. 12, before the test device tests the anti-stepping performance of the photovoltaic module 1, firstly, the photovoltaic module 1 is fixedly connected to the color steel tile 2 to form a photovoltaic assembly, and then the photovoltaic assembly is placed on the base 63. In this case, the base 63 is configured to bear the color steel tile 2, so as to improve accuracy and reliability of the test results of the test device. In other embodiments, the photovoltaic module 1 may be first fixed to another support structure and then placed on the base 63 for an anti-stepping performance test.

As shown in FIG. 11 and FIG. 12, the test device further includes a frame 64 extending along the second direction Z, and the frame 64 is mounted on the base 63. The first test member 61 and the second test member 62 are connected to the frame 64, and the first test member 61 and the second test member 62 can move along the second direction Z. In one or more embodiments, the first test member 61 and the second test member 62 are connected to the frame 64, and the first test member 61 and the second test member 62 can move along the second direction Z, which reduces the risk of injuries caused by manual handling of the test member during the test, thereby improving use safety of the test device.

In some embodiments, the test device further includes a drive assembly, and the first test member 61 and the second test member 62 are connected to the frame 64 through the drive assembly. The drive assembly can drive the first test member 61 and the second test member 62 to move synchronously along the first direction X and/or the third direction Y.

In one or more embodiments, the first test member 61 and the second test member 62 are driven by the drive assembly to move, which simplifies the operator's operations during the test, thereby improving use experience of the operator. The drive assembly can drive the test member to move synchronously along the first direction X and/or the third direction Y, which increases stepping paths of the first test member 61 and the second test member 62 on the photovoltaic module 1, thereby facilitating the first test member 61 and the second test member 62 to perform simulated stepping test on an entire surface of the photovoltaic module 1 and improving accuracy and reliability of the test results of the test device. At the same time, the drive assembly drives the test member to move, which is conducive to realizing automation of the test device, thereby simplifying the test process and shortening the test cycle. In addition, the first test member 61 and the second test member 62 move synchronously along the first direction X and/or the third direction Y, which reduces the risk of a change in the distance between the first test member 61 and the second test member 62 during the operation of the test device, thereby improving stability, accuracy, and reliability of the test results of the test device.

As shown in FIG. 11 and FIG. 12, the drive assembly includes a first drive member 65, a second drive member (not labelled in the figure), and a third drive member (not labelled in the figure). The first test member 61 and the second test member 62 are both mounted on the frame 64 through the first drive member 65. The first drive member 65 is configured to drive the first test member 61 and the second test member 62 to move alternately in the second direction Z. That is, when the first test member 61 abuts against the photovoltaic module 1, the second test member 62 is separated from the photovoltaic module 1. When the second test member 62 abuts against the photovoltaic module 1, the first test member 61 is separated from the photovoltaic module 1 to simulate the operator's walking and stepping actions on the surface of the photovoltaic module 1. The second drive member and the third drive member are configured to drive synchronous movement of the first test member 61 and the second test member 62 in the first direction X and the third direction Y. In some embodiments, the first test member 61 and the second test member 62 are connected to the second drive member through the first drive member 65, and the first test member 61 and the second test member 62 are connected to the third drive member through the first drive member 65. That is, the second drive member and the third drive member are configured to drive the first drive member 65 to move in the first direction X and the third direction Y to drive the first test member 61 and the second test member 62 to move synchronously.

The first drive member 65, the second drive member, and the third drive member are drive motors, so as to simplify structures of the first drive member 65, the second drive member, and the third drive member, thereby reducing the machining costs of the test device.

In one or more embodiments, as shown in FIG. 11, one first drive member 65 is provided, and the first drive member 65 is provided with a first telescopic rod 651 and a second telescopic rod 652 distributed along the first direction X. The first telescopic rod 651 and the second telescopic rod 652 are telescopic output shafts of the drive motor. The first test member 61 is mounted on the first telescopic rod 651, and the second test member 62 is mounted on the second telescopic rod 652. The first drive member 65 drives the first test member 61 to move through the first telescopic rod 651 and drives the second test member 62 to move through the second telescopic rod 652 respectively, so as to realize alternate movement of the first test member 61 and the second test member 62 in the second direction Z.

In other embodiments, as shown in FIG. 12, two first drive members 65 are provided. That is, the first drive members 65 include a first motor 653 and a second motor 654 distributed along the first direction X or the third direction Y. The first motor 653 is provided with a first telescopic rod 651, the first telescopic rod 651 is a telescopic output shaft of the first motor 653, the first test member 61 is mounted on the first telescopic rod 651, and the first motor 653 drives the first test member 61 to move through the first telescopic rod 651. The second motor 654 is provided with a second telescopic rod

652, the second telescopic rod 652 is a telescopic output shaft of the second motor 654, the second test member 62 is mounted on the second telescopic rod 652, and the second motor 654 drives the second test member 62 to move through the second telescopic rod 652. The first motor 653 and the second motor 654 are connected to the second drive member respectively, and the first motor 653 and the second motor 654 are connected to the third drive member respectively. The second drive member and the third drive member can drive the first motor 653 and the second motor 654 to move synchronously along the first direction X and/or the third direction Y, so as to realize synchronous movement of the first test member 61 and the second test member 62 in the first direction X and the third direction Y.

In one or more embodiments, the arrangement of the first motor 653 and the second motor 654 simplifies the way in which the first test member 61 and the second test member 62 are connected to the drive assembly, thereby simplifying structures of the first test member 61, the second test member 62, and the drive assembly and conducive to reducing the costs of the test device.

As shown in FIG. 14, along the second direction Z, a moving distance S1 of the first test member 61 satisfies: 0<S1≤60 mm. For example, the moving distance of the first test member 61 in the second direction Z may be 15 mm, 29 mm, 42 mm, or 60 mm. A moving distance S2 (not labelled in the figure) of the second test member 62 satisfies: 0<S2≤60 mm. For example, the moving distance of the second test member 62 in the second direction Z may be 15 mm, 29 mm, 42 mm, or 60 mm.

In one or more embodiments, if the moving distances of the first test member 61 and the second test member 62 in the second direction Z are longer, that is, S1>60 mm and S2>60 mm, lift heights of the first test member 61 and the second test member 62 are quite different from a lift height of the operator's two feet when walking, thereby reducing accuracy of the test results of the test device. Therefore, 0<S1≤60 mm and 0<S2≤60 mm are conducive to improving the accuracy of the test results of the test device.

In addition, the first test member 61 and the second test member 62 move alternately in the second direction Z. That is, the first test member 61 and the second test member 62 apply the preset load to the photovoltaic module 1 at a preset frequency. A time interval t from contact of the first test member 61 with the photovoltaic module 1 to contact of the second test member 62 with the photovoltaic module 1 satisfies: 0<t≤5 s. That is, the preset frequency is less than or equal to 5 seconds/time. In some embodiments, the preset frequency may be 1 second/time, 2 seconds/time, 3 seconds/time, 4 seconds/time, or 5 seconds/time.

If t>5 s, the test device applies the preset load to the photovoltaic module 1 at a lower frequency, resulting in a greater difference between a frequency at which the test device applies the preset load to the photovoltaic module 1 and a frequency at which the operator steps on the surface of the photovoltaic module 1. Therefore, 0<t≤5 s improves the accuracy and reliability of the test results of the photovoltaic module 1.

As shown in FIG. 11 and FIG. 12, the test device further includes a connector 66. The first test member 61 and the second test member 62 are connected with the first telescopic rod 651 and the second telescopic rod 652 respectively through the connector 66, so as to improve structural strength of the first drive member 65, the first test member 61, and the second test member 62 while reducing dimensions of the first test member 61, the second test member 62, the first telescopic rod 651, and the second telescopic rod

652 and reducing machining costs of the first test member 61 and the second test member 62, thereby prolonging the service life of the first drive member 65, the first test member 61, and the second test member 62.

Figure 17:
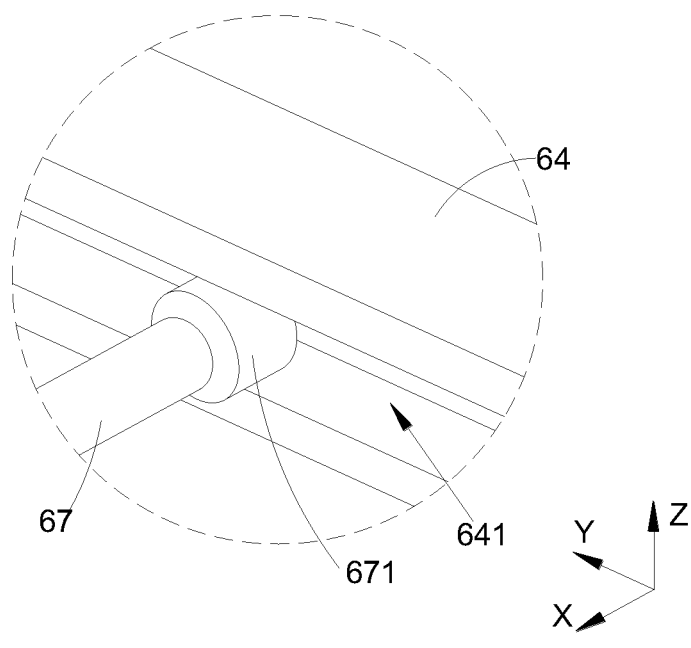
FIG. 17 is an enlarged view of Part I in FIG. 11.

As shown in FIG. 11, FIG. 12, and FIG. 17, the test device further includes a cantilever 67. Two ends of the cantilever 67 are connected to the frame 64, the first drive member 65 is connected to the cantilever 67, and the first drive member 65 can slide along an extension direction of the cantilever 67. The cantilever 67 is provided with a sliding portion 671, the frame 64 is provided with a sliding fit portion 641, at least part of the sliding portion 671 is located in the sliding fit portion 641, and the cantilever 67 can drive the first drive member 65 to slide along an extension direction of the sliding fit portion 641, thereby realizing movement of the first drive member 65 in the first direction X and the third direction Y.

The first drive member 65 is mounted on the frame 64 through the cantilever 67, which simplifies the way in which the first drive member 65 is connected to the frame 64, thereby simplifying structures of the first drive member 65 and the frame 64 and reducing overall machining costs of the test device.

In addition, the cantilever 67 and the frame 64 are connected through the sliding portion 671 and the sliding fit portion 641, which simplifies the way in which the cantilever 67 is connected to the frame 64, thereby simplifying structures of the cantilever 67 and the frame 64 and reducing machining costs of the cantilever 67 and the frame 64.

Figure 18:
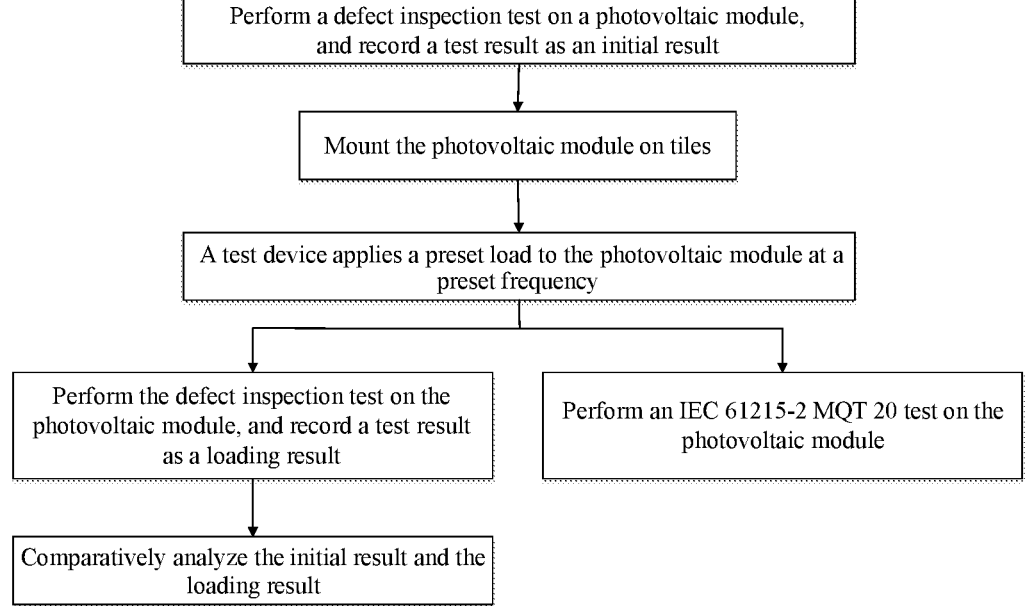
FIG. 18 is a flowchart of a method for testing a photovoltaic module according to one or more embodiments of the present disclosure.

Some embodiments of the present disclosure provide a method for testing a photovoltaic module, which is configured for testing anti-stepping performance of the photovoltaic module 1. As shown in FIG. 18, the test method includes: providing a photovoltaic module 1; performing a defect inspection test on the photovoltaic module 1, and recording a test result as an initial result; mounting the photovoltaic module 1 on a color steel tile assembly; applying a preset load to the photovoltaic module 1 at a preset frequency by using the test device 6 in any one of the above embodiments; performing the defect inspection test on the loaded photovoltaic module 1, and recording a test result as a loading result; and comparatively analyzing the initial result and the loading result, and determining degrees of changes in structure and function of the loaded photovoltaic module 1.

In some embodiments of the present disclosure, the test device 6 applies the preset load to the photovoltaic module 1 at the preset frequency, to be capable of simulating the process of the operator stepping on the surface of the photovoltaic module 1, performs the defect inspection test on the loaded photovoltaic module 1 and comparatively analyzes the initial result and the loading result, to be capable of judging whether a structure of the loaded photovoltaic module 1 meets a normal operation requirement of the photovoltaic module 1, thereby determining whether the operator's standing on the surface of the photovoltaic module 1 may affect the normal operation of the photovoltaic module 1 and realizing judgment of the anti-stepping performance of the photovoltaic module 1, so as to facilitate subsequent adjustment of parameters such as the structure, the material, and the manufacturing process of the photovoltaic module 1.

In some embodiments, the photovoltaic module 1 is provided with a steppable surface. The steppable surface includes a first test surface, a second test surface, and a third test surface, the first test surface is located at an edge of the connecting portion 13, the second test surface is located at the unsupported portion 14, and the third test surface is located at a corner of the photovoltaic module 1.

As shown in FIG. 18, the step of applying a preset load to the photovoltaic module 1 at a preset frequency by using the test device 6 includes: driving, by the drive assembly, the test member to move along the first direction X and/or the third direction Y, and at the same time, driving, by the drive assembly, the test member to move along the second direction Z at the preset frequency, so that the test member applies the preset load to at least one of the first test surface, the second test surface, and the third test surface at the preset frequency.

In one or more embodiments, within one test cycle of the test device 6, the test device 6 may apply the preset load to only one of the first test surface, the second test surface, and the third test surface, to simplify a movement trajectory of the test member in a horizontal plane defined by the first direction X and the third direction Y. In other embodiments, within one test cycle of the test device 6, the test device 6 may apply the preset load to at least two of the first test surface, the second test surface, and the third test surface, so as to test the anti-stepping performance of the entire surface of the photovoltaic module 1.

As shown in FIG. 18, the step of applying a preset load to the photovoltaic module 1 at a preset frequency by using the test device 6 includes: selecting a first test point 11 on the first test surface, the second test surface, or the third test surface; and applying, by the test member, the preset load to the first test point 11 during movement of the test member.

In one or more embodiments, within one test cycle of the test device 6, the test device 6 may apply the preset load to only one test point on the steppable surface.

In other embodiments, within one test cycle of the test device 6, the test device 6 may apply the preset load to at least two test points on the steppable surface. In some embodiments, subsequent to the step of applying, by the test member, the preset load to the first test point 11, the step of applying a preset load to the photovoltaic module 1 at a preset frequency by using the test device 6 includes: selecting a second test point 12 on the first test surface, the second test surface, or the third test surface, the second test point 12 and the first test point 11 are distributed along the first direction X and/or the third direction Y; and applying, by the test member, the preset load to the second test point 12 during movement of the test member.

In one or more embodiments, the first test point 11 and the second test point 12 are located on a same one of the first test surface, the second test surface, and the third test surface. That is, within one test cycle of the test device 6, the test device 6 successively applies the preset load twice to the first test surface or the second test surface or the third test surface, so as to improve reliability of the test results of the anti-stepping performance at the first test surface, the second test surface, and the third test surface of the photovoltaic module 1.

In other embodiments, the first test point 11 and the second test point 12 are located on different ones of the first test surface, the second test surface, and the third test surface. That is, within one test cycle of the test device 6, the test device 6 successively applies the preset load to two of the first test surface, the second test surface, and the third test surface. By taking the first test surface and the second test surface as an example, the first test point 11 is located on the first test device, the second test point 12 is located on the second test surface, and the test device 6 successively applies the preset load to the first test point 11 and the second test point 12, so as to test the anti-stepping performance of different positions on the photovoltaic module 1.

In addition, within one test cycle of the test device 6, the test device 6 applies the preset load multiple times to the steppable surface. Specific numbers of the test points and distribution positions of the test points are not limited in the embodiments of the present disclosure.

In one or more embodiments, the photovoltaic module 1 further includes a fourth test surface outside the first test surface, the second test surface, and the third test surface. That is, the first test surface, the second test surface, the third test surface, and the fourth test surface form the steppable surface of the photovoltaic module 1. The first test surface is provided with at least one first test point 11, the second test surface is provided with at least one second test point 12, the third test surface is provided with at least one third test point 15, and the fourth test surface is provided with at least one fourth test point (not labelled in the figure).

The step of applying a preset load to the photovoltaic module 1 at a preset frequency by using the test device 6 includes: selecting the first test point 11 on the first test surface, selecting the second test point 12 on the second test surface, selecting the third test point 15 on the third test surface, and selecting the fourth test point on the fourth test surface; driving, by the drive assembly, the test member to move along the first direction X and/or the third direction Y, and at the same time, driving the test member to move at the preset frequency along the second direction Z; and applying, by the test member, the preset load to the first test point 11, the second test point 12, the third test point 15, and the fourth test point during movement of the test member.

In one or more embodiments, the preset load is applied to the first test surface, the second test surface, the third test surface, and the fourth test surface respectively by using the test device 6, which can realize the test on the anti-stepping performance of the entire surface of the photovoltaic module 1.

The photovoltaic module 1 includes a first edge (not labelled in the figure) extending along the first direction X and a second edge (not labelled in the figure) extending along the third direction Y.

Figure 19:
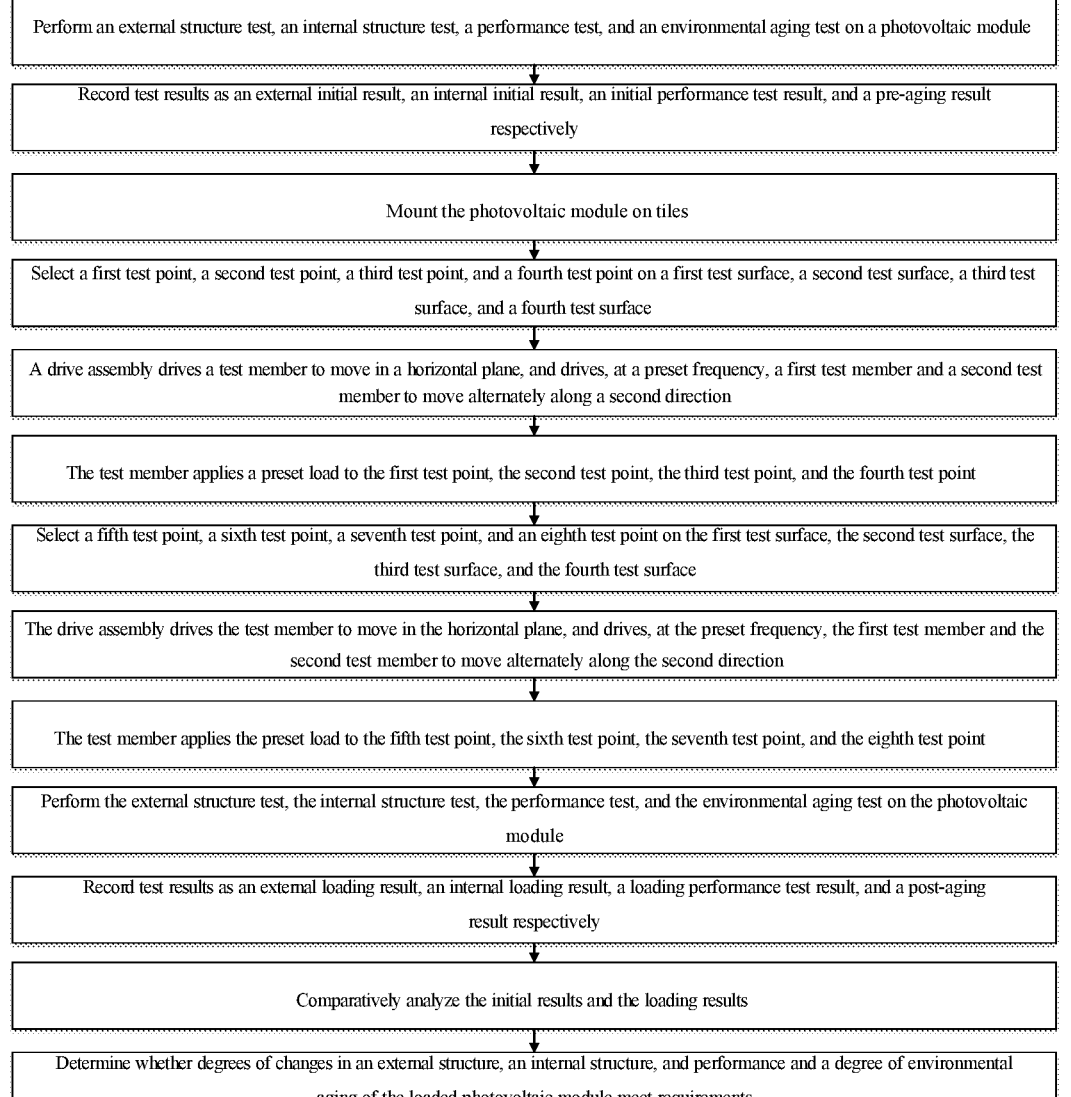
FIG. 19 is a flowchart of the method for testing a photovoltaic module in FIG. 18 according to one or more embodiments of the present disclosure.

As shown in FIG. 18 and FIG. 19, when the two sides of the photovoltaic module 1 are respectively bonded to the bending portions 24 on the male rib 21 and the female rib 22, parts of the photovoltaic module 1 for bonding to the bending portions 24 are connecting portions. In one or more embodiments, the first connecting portion extends along the first direction X, and the first connecting portion is located at the first edge. In this case, a minimum distance between the first test point 11 and the first connecting portion in the third direction Y is less than 340 mm. In other embodiments, the first connecting portion extends along the third direction Y, and the first connecting portion is located at the second edge 27. In this case, a minimum distance between the first test point 11 and the first connecting portion in the first direction X is less than 340 mm.

In one or more embodiments, if the distance between the first test point 11 and the first connecting portion is longer, the first test point 11 deviates from a position where the stress of the first connecting portion is the greatest, thereby reducing accuracy and reliability of a test result of the first connecting portion. Therefore, the minimum distance between the first test point 11 and the first connecting portion is less than 340 mm, which is conducive to improving accuracy and reliability of the test result of the first connecting portion.

For example, the minimum distance between the first test point 11 and the first connecting portion in the first direction X or the third direction Y is less than or equal to 210 mm, which may be, for example, 60 mm, 80 mm, 90 mm, 108 mm, 166 mm, 200 mm, or 210 mm.

In one or more embodiments, if the minimum distance between the first test point 11 and the first connecting portion in the first direction X or the third direction Y is shorter, during the test on the anti-stepping performance of the first connecting portion by the test device 6 at the first test point 11, a distance between the test device 6 and the first bending portion 241 is shorter, and there are risks of invalid test results, damages to the test device 6, and damages to the first bending portion 241 under the influence of factors such as mounting errors and processing errors. Therefore, the minimum distance between the first test point 11 and the first connecting portion is less than or equal to 210 mm, which can increase the distance between the test device 6 and the first bending portion 241, thereby prolonging the service life of the test device 6 and the color steel tile 2 and improving operation stability of the test device 6 and, at the same time, being conducive to improving the accuracy and reliability of the test results of the first connecting portion.

When the photovoltaic module 1 is fixed to the color steel tile 2 through the clamp 4, a part of the photovoltaic module 1 for connection with the clamp 4 is the first connecting portion. Along the first direction X and/or the third direction Y, a plurality of clamps 4 are spaced apart to improve stability of the connection of the photovoltaic module 1.

Figure 9:
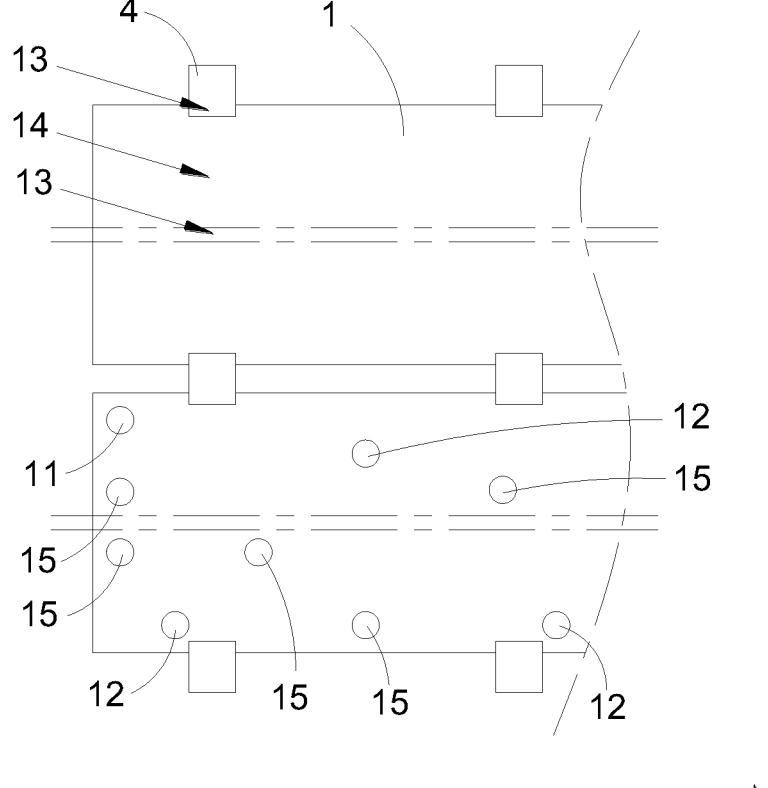
FIG. 9 is a top view of the photovoltaic assembly in FIG. 4 according to one or more embodiments of the present disclosure.
Figure 10:
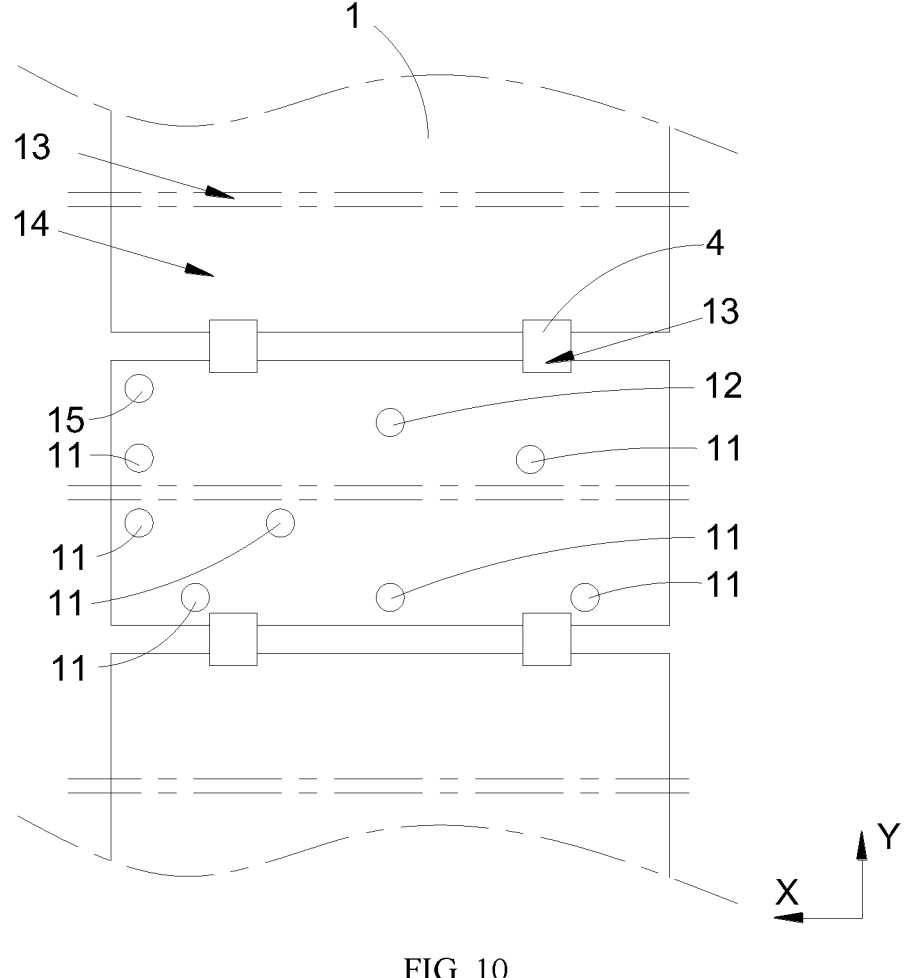
FIG. 10 is a top view of the photovoltaic assembly in FIG. 4 according to some other embodiments of the present disclosure.

As shown in FIG. 9 and FIG. 10, along the first direction X and/or the third direction Y, one or two sides of the clamp 4 is/are provided with the first test point 11.

In one or more embodiments, the clamp 4 clamps the first connecting portion of the photovoltaic module 1. When the photovoltaic module 1 is subjected to the pressure in the second direction Z, an edge position of the first connecting portion in contact with the clamp 4 is subjected to greater stress, and the first test point 11 is arranged at the edge position of the first connecting portion, which can facilitate the test on anti-stepping performance of the edge position of the first connecting portion in contact with the clamp 4, which is conducive to improving the anti-stepping performance of the first connecting portion.

In one or more embodiments, one side of the clamp 4 is provided with the first test point 11 to shorten the cycle of the test on the anti-stepping performance of the photovoltaic module 1. In other embodiments, along the distribution direction of the clamps 4, two sides of the clamps 4 are each provided with the first test point 11, so as to improve accuracy and reliability of the test on the anti-stepping performance of the first connecting portion.

In addition, one first test point 11 may be arranged between two adjacent clamps 4. In this case, the first test point 11 is located at a midpoint of a line connecting the two clamps 4. In other embodiments, a plurality of first test points 11 may be spaced apart between two adjacent clamps 4, and the first test points 11 between the two adjacent clamps 4 may be uniformly distributed or non-uniformly distributed.

In some embodiments, as shown in FIG. 10, the first connecting portion is located at the first edge. That is, the clamp 4 clamps the first edge of the photovoltaic module 1. A minimum distance between the first test point 11 and the clamp 4 in the first direction X is less than or equal to 210 mm, which may be, for example, 80 mm, 90 mm, 160 mm, 200 mm, or 210 mm. In other embodiments, as shown in FIG. 9, the first connecting portion is located at the second edge. That is, the clamp 4 clamps the second edge of the photovoltaic module 1. A minimum distance between the first test point 11 and the clamp 4 in the third direction Y is less than or equal to 210 mm, which may be, for example, 80 mm, 90 mm, 160 mm, 200 mm, or 210 mm.

In one or more embodiments, if the minimum distance between the first test point 11 and the clamp 4 in the first direction X and/or the third direction Y is greater than 210 mm, the first test point 11 deviates from a position where the stress of the first connecting portion is the greatest, thereby reducing accuracy and reliability of the test result of the first connecting portion. Therefore, the minimum distance between the first test point 11 and the clamp 4 in the first direction X and/or the third direction Y is less than or equal to 210 mm, which is conducive to improving the accuracy and reliability of the test result of the first connecting portion.

The minimum distance between the first test point 11 and the clamp 4 in the first direction X ranges from 90 mm to 210 mm, which may be, for example, 90 mm, 108 mm, 166 mm, 200 mm, or 210 mm. In other embodiments, the minimum distance between the first test point 11 and the clamp 4 in the third direction Y ranges from 90 mm to 210 mm, which may be, for example, 90 mm, 108 mm, 166 mm, 200 mm, or 210 mm.

In one or more embodiments, if the minimum distance between the first test point 11 and the clamp 4 in the first direction X and/or the third direction Y is less than 90 mm, during the test on the anti-stepping performance of the first connecting portion by the test device 6 at the first test point 11, a distance between the test device 6 and the clamp 4 is shorter, and under the influence of factors such as mounting errors and processing errors, there is a risk that the test device 6 interferes with the clamp 4, thereby increasing risks of invalid test results, damages to the test device 6, and damages to the first bending portion 4. Therefore, the minimum distance between the first test point 11 and the clamp 4 in the first direction X and/or the third direction Y ranges from 90 mm to 210 mm, which can increase the distance between the test device 6 and the clamp 4, thereby prolonging the service life of the test device 6 and the clamp 4 and improving operation stability of the test device 6, and at the same time, being conducive to improving the accuracy and reliability of the test results of the first connecting portion.

As shown in FIG. 7 to FIG. 10, the second test point 12 is located at the unsupported portion 14. In one or more embodiments, the second test point 12 coincides with a geometric center of the unsupported portion 14. That is, the second test point 12 is located in the middle of the unsupported portion 14.

When the photovoltaic module 1 is subjected to pressure in the second direction Z, a distance between a middle position of the unsupported portion 14 and the supporting portion is the greatest, so that deformation of the middle of the unsupported portion 14 of the photovoltaic module 1 is the greatest. Therefore, the arrangement of the second test point 12 at the middle position of the unsupported portion 14 can improve accuracy and reliability of the test on the anti-stepping performance of the unsupported portion 14.

Figure 8:
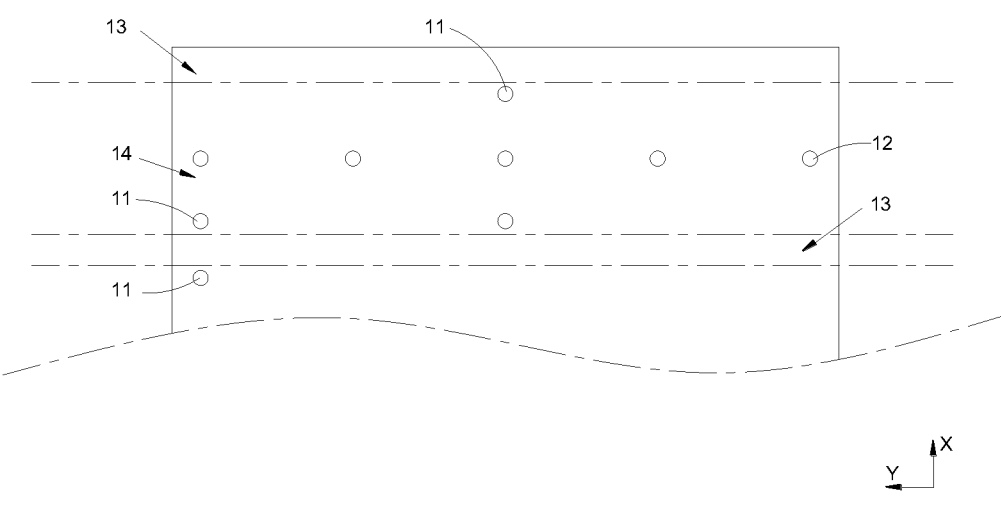
FIG. 8 is a schematic diagram of positions of test points on a photovoltaic module in FIG. 7 according to one or more embodiments of the present disclosure.

In addition, as shown in FIG. 8 to FIG. 10, a plurality of second test points 12 may be provided. The plurality of second test points 12 are spaced apart along the first direction X and/or the third direction Y.

In one or more embodiments, a plurality of second test points 12 are arranged at the unsupported portion 14. That is, the anti-stepping test is performed on the unsupported portion 14 multiple times by using the test device 6, which can further improve the accuracy and reliability of the test on the anti-stepping performance of the unsupported portion 14.

As shown in FIG. 9 and FIG. 10, the third test point 15 is arranged at a corner. A vertical distance between the third test point 15 and the first edge is less than or equal to 300 mm. A vertical distance between the third test point 15 and the second edge is less than or equal to 300 mm.

If the vertical distance between the third test point 15 and the first edge and the vertical distance between the third test point 15 and the second edge are longer, the third test point 15 deviates from a position where the stress at the corner is the greatest, thereby reducing accuracy and reliability of a test result of the third test point 15. Therefore, the vertical distance between the third test point 15 and the first edge and the vertical distance between the third test point 15 and the second edge are less than or equal to 300 mm, which improves consistency of the pressure applied by the test device 6 to the photovoltaic module 1, and improves the accuracy and reliability of the test result of the third test point 15.

The vertical distance between the third test point 15 and the first edge and the vertical distance between the third test point 15 and the second edge may be the same or different, so as to increase flexibility of the setting position of the third test point 15.

In addition, in one or more embodiments, one third test point 15 is provided to shorten the test cycle. In other embodiments, a plurality of third test points 15 are provided, and the photovoltaic module 1 has four corners. For the convenience of description, the four corners are respectively recorded as a first corner, a second corner, a third corner, and a fourth corner. At least one of the first corner, the second corner, the third corner, and the fourth corner is provided with at least one third test point 15 to increase the accuracy and reliability of the test result, which, at the same time, is conducive to the test on the anti-stepping performance of the entire surface of the photovoltaic module 1, which is conducive to improving the anti-stepping performance of the entire surface of the photovoltaic module 1.

In one or more embodiments, the test device 6 can perform a stepping test on the photovoltaic module 1 once to shorten the test cycle of the photovoltaic module 1.

In other embodiments, the test device 6 performs the stepping test on the photovoltaic module 1 multiple times to improve the accuracy and reliability of the test result.

When the test device 6 performs the second stepping test on the photovoltaic module 1, the step of applying a preset load to the photovoltaic module 1 at a preset frequency by using the test device 6 includes: selecting a fifth test point on the first test surface, selecting a sixth test point on the second test surface, selecting a seventh test point on the third test surface, and selecting an eighth test point on the fourth test surface; driving, by the drive assembly, the test member to move along the first direction X and/or the third direction Y, and at the same time, driving the test member to move at the preset frequency along the second direction Z; and applying, by the test member, the preset load to the fifth test point, the sixth test point, the seventh test point, and the eighth test point during the movement of the test member.

The first test point 11 and the fourth test point are distributed along the first direction X and/or the third direction Y, and/or the second test point 12 and the fifth test point are distributed along the first direction X and/or the third direction Y, and/or the third test point 15 and the sixth test point are distributed along the first direction X and/or the third direction Y, and/or the fourth test point and the eighth test point are distributed along the first direction X and/or the third direction Y, so as to improve the accuracy and reliability of the test result.

In some embodiments, the defect inspection of the photovoltaic module 1 includes appearance inspection, so as to determine the degree of damages to an appearance of the loaded photovoltaic module 1, thereby improving reliability of a judgment result of the anti-stepping performance of the photovoltaic module 1.

As shown in FIG. 18 and FIG. 19, the step of performing a defect inspection test on the photovoltaic module 1, and recording a test result as an initial result includes: performing the appearance inspection on the photovoltaic module 1, and recording a test result as an appearance initial result.

The step of performing the defect inspection test on the loaded photovoltaic module 1, and recording a test result as a loading result includes: performing the appearance inspection on the photovoltaic module 1, and recording a test result as an appearance loading result.

The step of comparatively analyzing the initial result and the loading result, and determining degrees of changes in a structure and a function of the loaded photovoltaic module 1 includes: comparatively analyzing the appearance initial result and the appearance loading result, and determining a degree of change in the appearance of the loaded photovoltaic module 1 according to an appearance change.

The appearance inspection includes external defect inspection and/or an internal defect test, so as to improve accuracy of the test result.

As shown in FIG. 18 and FIG. 19, the step of performing a defect inspection test on the photovoltaic module 1, and recording a test result as an initial result includes: performing the external defect inspection on the photovoltaic module 1, and recording a test result as an external initial result; and performing the internal defect test on the photovoltaic module 1, and recording a test result as an internal initial result.

The step of performing the external defect inspection on the photovoltaic module 1, and recording a test result as an external initial result includes: inspecting numbers, positions, and sizes of pits, cracks, damages, etc. on an outer surface of the photovoltaic module 1, and recording an inspection result as the external initial result.

The step of performing the internal defect test on the photovoltaic module 1, and recording a test result as an internal initial result includes: testing internal defects of the photovoltaic module 1 by using an electroluminescence tester (EL tester), and recording numbers, positions, and sizes of internal hidden cracks, debris, and other defects as the internal initial result.

As shown in FIG. 18 and FIG. 19, the step of performing the defect inspection test on the loaded photovoltaic module 1, and recording a test result as a loading result includes: performing the external defect inspection on the photovoltaic module 1, and recording a test result as an external loading result; and performing the internal defect test on the photovoltaic module 1, and recording a test result as an internal loading result.

The external defect inspection is MQT 01 appearance inspection, and the internal defect test is an EL test.

The step of performing the external defect inspection on the photovoltaic module 1, and recording a test result as an external loading result includes: inspecting numbers, positions, and sizes of pits, cracks, broken electrodes, etc. on the outer surface of the photovoltaic module 1, and recording an inspection result as the external loading result.

The step of performing the internal defect test on the photovoltaic module 1, and recording a test result as an internal loading result includes: testing internal defects of the photovoltaic module 1 by using an EL tester, and recording numbers, positions, and sizes of internal hidden cracks, debris, and other defects as the internal loading result.

As shown in FIG. 18 and FIG. 19, the step of comparatively analyzing the initial result and the loading result, and determining degrees of changes in a structure and a function of the loaded photovoltaic module 1 includes: comparatively analyzing the external initial result and the external loading result, and determining a degree of change in external defects of the loaded photovoltaic module 1 according to changes in a number and a size of defects on the outer surface; comparatively analyzing the internal initial result and the internal loading result, and determining a degree of change in internal defects of the loaded photovoltaic module 1 according to changes in a number and a size of the internal defects; and determining, according to the degrees of changes in the external defects and the internal defects of the loaded photovoltaic module 1, whether the anti-stepping performance of the photovoltaic module 1 meets a production requirement.

In one or more embodiments, during the stepping testing on the photovoltaic module 1 by the test device 6, if there are obvious cracks, broken electrodes, etc. on the outer surface of the photovoltaic module 1, or if an external structure of the loaded photovoltaic module 1 changes greatly, the anti-stepping performance of the photovoltaic module 1 is unqualified, the test is stopped directly, and the stepping testing is performed again after adjustment of parameters such as the structure, the process, and the material of the photovoltaic module 1. If the degree of change in the external defects of the loaded photovoltaic module 1 is less, the anti-stepping performance of the photovoltaic module 1 meets the requirement, and the photovoltaic module 1 can be put into production and use.

In addition, the defect inspection test on the photovoltaic module 1 further includes a performance test, the step of performing a defect inspection test on the photovoltaic module 1, and recording a test result as an initial result includes: testing performance of the photovoltaic module 1, and recording a test result as an initial performance test result.

The step of performing the defect inspection test on the loaded photovoltaic module 1, and recording a test result as a loading result includes: testing performance of the loaded photovoltaic module 1, and recording a test result as a loading performance test result.

The step of comparatively analyzing the initial result and the loading result, and determining degrees of changes in a structure and a function of the loaded photovoltaic module 1 includes: comparatively analyzing the initial performance test result and the loading performance test result, and determining, according to a degree of change in the performance, whether the anti-stepping performance of the photovoltaic module 1 meets the production requirement.

The performance test includes, but is not limited to, an MQT 19.1 initial steady-state test, an MQT 06.1 standard test condition (STC) power test, an MQT 03 insulation test, an MQT 15 wet leakage current test, etc. A specific type and a number of the performance test are not limited in the present disclosure.

In addition, the defect inspect test on the photovoltaic module 1 further includes an environmental aging test. The environmental aging test includes, but is not limited to, an MQT 11 thermal cycle test, an MQT 12 humidity-freeze test, and an MQT 13 humidity thermal cycle test. Specific content and a number of the environmental aging test are not limited in the embodiments of the present disclosure.

The step of performing a defect inspection test on the photovoltaic module 1, and recording a test result as an initial result includes: performing the environmental aging test on the photovoltaic module 1, and recording a test result as a pre-aging result.

The step of performing the defect inspection test on the loaded photovoltaic module 1, and recording a test result as a loading result includes: performing the environmental aging test on the loaded photovoltaic module 1, and recording a test result as a post-aging result.

The step of comparatively analyzing the initial result and the loading result, and determining degrees of changes in a structure and a function of the loaded photovoltaic module 1 includes: comparatively analyzing the pre-aging result and the post-aging result, and determining whether a degree of environmental aging of the photovoltaic module 1 meets the production requirement.

In addition, subsequent to the step of applying a preset load to the photovoltaic module at a preset frequency by using the test device, the method for testing a photovoltaic module may further include: performing an IEC 61215-2 MQT 20 test on the photovoltaic module 1. That is, after the photovoltaic module 1 is mounted on a color steel tile assembly, the photovoltaic module 1 is pulled up and down in a second direction Z by using a device, a pull-up and pull-down operation is regarded as a test cycle, and the photovoltaic module 1 is tested about a thousand times by using the device, to test structural stability of the loaded photovoltaic module 1.

When the test device 6 performs a stepping test on the photovoltaic module 1 for multiple times, for example, twice, after completion of the second stepping test, the photovoltaic module 1 is required to be subjected to appearance inspection, an operation performance test, and an environmental aging test, and after completion of the first stepping test, the appearance inspection, the operation performance test, and the environmental aging test may be or not be performed on the photovoltaic module 1, so as to shorten the test cycle.

In any one of the above embodiments, the preset load F satisfies: 50 KG≤F≤160 KG. In some embodiments, the preset load may be 50 KG, 96 KG, 102 KG, 160 KG, or the like.

When the operator stands on the surface of the photovoltaic module 1 for mounting, there are situations where the operator carries a mounting tool, transports the photovoltaic module 1, etc. If the preset load is less, that is, F<50 KG, the test result is less reliable. If the preset load is greater, that is, F>160 KG, test costs of the photovoltaic module 1 are increased, and manufacturing costs of the photovoltaic module 1 are increased. Therefore, in one or more embodiments, 50 KG≤F≤160 KG can improve reliability of the test result of the photovoltaic module 1 and reduce the test costs of the photovoltaic module 1.

In addition, a moving distance L3 of the test member in the second direction Z satisfies: 0<L3≤60 mm, so that the moving distance of the test member in the second direction Z matches a lifting height of the two feet when the operator steps on the surface of the photovoltaic module 1, thereby improving accuracy and reliability of the test result.

Based on the above, as shown in FIG. 11, FIG. 18, and FIG. 19, the method for testing a photovoltaic module according to some embodiments of the present disclosure includes: providing a photovoltaic module 1; performing external defect inspection on the photovoltaic module 1, and recording a test result as an external initial result; performing an internal defect test on the photovoltaic module 1, and recording a test result as an internal initial result; testing performance of the photovoltaic module 1, and recording a test result as an initial performance test result; performing an environmental aging test on the photovoltaic module 1, and recording a test result as a pre-aging result; placing the photovoltaic module 1 on a base 63 of a test device 6; driving, by a second drive member, a first test member 61 and a second test member 62 to move synchronously along a first direction X, and/or, driving, by a third drive member, the first test member 61 and the second test member 62 to move synchronously along a third direction Y, and at the same time, driving, at a preset frequency by a first drive member 65, the first drive member 65 and the second drive member to move alternately in a second direction Z, so that the first drive member 65 and the second drive member successively apply a preset load to a surface of the photovoltaic module 1, the drive member successively applies the preset load to a first test point 11, a second test point 12, a third test point 15, and a fourth test point; driving, by the second drive member, the first test member 61 and the second test member 62 to move synchronously along the first direction X, and/or, driving, by the third drive member, the first test member 61 and the second test member 62 to move synchronously along the third direction Y, and at the same time, driving, at the preset frequency by the first drive member 65, the first drive member 65 and the second drive member to move alternately in the second direction Z, so that the first drive member 65 and the second drive member successively apply the preset load to the surface of the photovoltaic module 1, the drive member successively applies the preset load to a fifth test point, a sixth test point, a seventh test point, and an eighth test point; performing the internal defect test on the loaded photovoltaic module 1, and recording a test result as an internal loading result; performing the external defect inspection on the loaded photovoltaic module 1, and recording a test result as an external loading result; performing a performance test on the loaded photovoltaic module 1, and recording a test result as a loading performance test result; performing an IEC 61215-2 MQT 20 test on the loaded photovoltaic module 1; performing the environmental aging test on the loaded photovoltaic module 1, and recording a test result as a post-aging result; comparatively analyzing the external initial result and the external loading result, and determining a degree of change in an external defect of the loaded photovoltaic module 1; comparatively analyzing the internal initial result and the internal loading result, and determining a degree of change in an internal defect of the loaded photovoltaic module 1; comparatively analyzing the initial performance test result and the loading performance test result, and determining a degree of change in performance of the loaded photovoltaic module 1; comparatively analyzing the pre-aging result and the post-aging result, and determining a degree of environmental aging of the photovoltaic module 1; and determining the anti-stepping performance of the photovoltaic module 1 according to the degree of change in the external defect, the degree of change in the internal defect, the degree of change in the performance, and the degree of environmental aging of the photovoltaic module 1.

Orders and numbers of times of the internal defect test, the external defect test, the IEC 61215-2 MQT 20 test, and the environmental aging test are not limited in the present disclosure.

The above are merely preferred embodiments of the present disclosure and are not intended to limit the present disclosure. For those skilled in the art, the present disclosure may be subject to various changes and variations. Any modification, equivalent replacement, improvement, and the like made within the spirit and principles of the present disclosure shall fall within the protection scope of the present disclosure Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for testing a photovoltaic module, applied for testing anti-stepping performance of the photovoltaic module, wherein the method comprises:

performing a defect inspection test on the photovoltaic module, and recording a test result as an initial result;

mounting the photovoltaic module on a color steel tile assembly;

applying a preset load to the photovoltaic module at a preset frequency by using a test device;

performing the defect inspection test on the loaded photovoltaic module, and recording a test result as a loading result; and comparatively analyzing the initial result and the loading result;

wherein the photovoltaic module comprises a connecting portion and an unsupported portion, the connecting portion is configured to contact the color steel tile assembly, and the unsupported portion is configured to define a cavity with a color steel tile;

the photovoltaic module is provided with a first test surface, a second test surface, and a third test surface, the first test surface is located at an edge of the connecting portion, the second test surface is located at the unsupported portion, the third test surface is located at a corner of the photovoltaic module;

the test device comprises a drive assembly and a test member, the drive assembly is capable of driving the test member to move along a length direction, a width direction, and a thickness direction of the photovoltaic module; and the applying a preset load to the photovoltaic module at a preset frequency by using a test device comprises:

driving, by the drive assembly, the test member to move along the length direction and/or the width direction of the photovoltaic module and, at the same time, driving, by the drive assembly, the test member to move along the thickness direction of the photovoltaic module at the preset frequency; and applying, by the test member, the preset load to at least one of the first test surface, the second test surface, and the third test surface;

wherein the test member comprises a first test member and a second test member spaced apart along a width direction of the photovoltaic module;

said driving, by the drive assembly, the test member to move along the thickness direction of the photovoltaic module at the preset frequency, comprises:

driving, by the drive assembly, the first test member and the second test member to move alternately along the thickness direction.

2. The method for testing a photovoltaic module according to claim 1, wherein the applying a preset load to the photovoltaic module at a preset frequency by using a test device comprises:

applying, by the test member, the preset load to the first test surface, the second test surface, and the third test surface during movement of the test member.

3. The method for testing a photovoltaic module according to claim 1, wherein the photovoltaic module is further provided with a fourth test surface, and the fourth test surface is a surface other than the first test surface, the second test surface, and the third test surface; and the applying a preset load to the photovoltaic module at a preset frequency by using a test device comprises:

applying, by the test member, the preset load to the fourth test surface during movement of the test member.

4. The method for testing a photovoltaic module according to claim 1, wherein the defect inspection test comprises appearance inspection;

the performing a defect inspection test on the photovoltaic module, and recording a test result as an initial result comprises:

inspecting an appearance of the photovoltaic module, and recording a number and a size of appearance defects of the photovoltaic module as an appearance initial result;

the performing the defect inspection test on the loaded photovoltaic module, and recording a test result as a loading result comprises:

inspecting an appearance of the loaded photovoltaic module, and recording a number and a size of appearance defects of the loaded photovoltaic module as an appearance loading result;

the comparatively analyzing the initial result and the loading result comprises:

comparatively analyzing the appearance initial result and the appearance loading result, and determining a degree of change in the appearance of the loaded photovoltaic module; and the appearance inspection comprises an external defect inspection and/or an internal defect test.

5. The method for testing a photovoltaic module according to claim 1, wherein the defect inspection test comprises a performance test;

the performing a defect inspection test on the photovoltaic module, and recording a test result as an initial result comprises:

testing performance of the photovoltaic module, and recording a test result as an initial performance test result; and the performing the defect inspection test on the loaded photovoltaic module, and recording a test result as a loading result comprises:

testing performance of the loaded photovoltaic module, and recording a test result as a loading performance test result; and comparatively analyzing the initial performance test result and the loading performance test result, and determining a degree of change in the performance of the loaded photovoltaic module.

6. The method for testing a photovoltaic module according to claim 1, wherein the defect inspection test comprises an environmental aging test;

the performing a defect inspection test on the photovoltaic module, and recording a test result as an initial result comprises:

performing the environmental aging test on the photovoltaic module, and recording a test result as a pre-aging result;

the performing the defect inspection test on the loaded photovoltaic module, and recording a test result as a loading result comprises:

performing the environmental aging test on the loaded photovoltaic module, and recording a test result as a post-aging result; and the comparatively analyzing the initial result and the loading result comprises:

comparatively analyzing the pre-aging result and the post-aging result, and determining a degree of environmental aging of the loaded photovoltaic module.

7. The method for testing a photovoltaic module according to claim 1, wherein, subsequent to the applying a preset load to the photovoltaic module at a preset frequency by using a test device, the method comprises:

performing an International Electrotechnical Commission (IEC) 61215-2 module qualification test (MQT) 20 test on the photovoltaic module.

* * * * *